(12) United States Patent
Asokan et al.

(10) Patent No.: US 12,207,003 B2
(45) Date of Patent: Jan. 21, 2025

(54) SYSTEM AND METHOD FOR IR SUBTRACTION IN AN RGB-IR IMAGE SENSOR USING FPGA

(71) Applicant: e-con Systems India Private Limited, Chennai (IN)

(72) Inventors: Arun Asokan, Chennai (IN); Ramesh Ponmuthu, Chennai (IN)

(73) Assignee: e-con Systems India Private, Chennai (IN)

( * ) Notice: Subject to any disclaimer, the term of this patent is extended or adjusted under 35 U.S.C. 154(b) by 180 days.

(21) Appl. No.: 18/116,347

(22) Filed: Mar. 2, 2023

(65) Prior Publication Data

US 2024/0298093 A1    Sep. 5, 2024

(51) Int. Cl.
*H04N 23/84* (2023.01)
*G06T 7/90* (2017.01)
*H04N 23/11* (2023.01)

(52) U.S. Cl.
CPC ............ *H04N 23/84* (2023.01); *G06T 7/90* (2017.01); *H04N 23/11* (2023.01); *G06T 2207/10024* (2013.01); *G06T 2207/10048* (2013.01)

(58) Field of Classification Search
None
See application file for complete search history.

(56) References Cited

U.S. PATENT DOCUMENTS

| 2014/0307098 A1 | 10/2014 | Kang et al. |
| 2017/0163954 A1 | 6/2017 | Sato et al. |
| 2017/0289466 A1 | 10/2017 | Ge et al. |
| 2023/0388667 A1* | 11/2023 | Sharabi ............... H04N 23/843 |

FOREIGN PATENT DOCUMENTS

| CN | 103546741 A | 1/2014 |
| CN | 103686111 A | 11/2016 |
| CN | 113099187 A | 6/2022 |
| CN | 113365034 | 9/2022 |
| JP | 2015204579 A | 11/2015 |

* cited by examiner

*Primary Examiner* — Christopher Braniff

(57) ABSTRACT

A method and system to produce an enhanced color image of Bayer 2×2 pixel pattern, and IR image, from 4×4 pixel initial color pattern containing separate R, G, B, and infrared (IR) light pixels, the method predicting color and IR replacement pixels, determining calibrated IR contents, providing enhanced color R, G, B, and replacement B pixels by subtracting the calibrated IR contents from each of the R, G and B pixels, and constituting the enhanced color image of Bayer 2×2 pixel RGGB pattern from said enhanced color R, G, and B pixels; the system comprising an RGB IR camera with a dual pass filter permitting visible light and infra-red light as separate R, G, B and IR pixels, an integrated circuit device configured to predict pixels, convert 4×4 pixel patterns to 2×2 Bayer color patterns and IR patterns, wherein the integrated circuit device is a field programmable gate array.

13 Claims, 27 Drawing Sheets
(17 of 27 Drawing Sheet(s) Filed in Color)

SYSTEM AND METHOD FOR IR SUBTRACTION IN AN RGB-IR IMAGE SENSOR USING FPGA

FIELD OF THE INVENTION

The present invention relates to infra-red (IR) content subtraction from color/RGB images. Particularly, the present invention relates to IR subtraction from RGB-IR pixel patterns, and more particularly to a method and system for such IR subtraction.

BACKGROUND OF THE INVENTION

Mother earth is surrounded with infra-red light rays. While infra-red (IR) light rays are not within vision capability of humans, the cameras and image sensors sense and capture them.

Infra-red (IR) contents of a color image are generally undesirable since they compromise on colors. On the other hand, infra-red images are of big significance for computer vision systems and tasks, embedded vision hardware and technology to assist in process control and automation, 'near infra-red' (NIR) imaging applications related to safety and surveillance and medical science.

For camera sensors, IR light is eliminated intentionally by inserting an IR cut filter in front of the surface of an image sensor to avoid color degradation. An IR signal, however, is valuable for getting additional information such as the veins lying beneath the skin because IR penetrates into deep skin whereas visible light doesn't.

FIGS. 1A, 1B and 1C qualitatively illustrate difference between an uncorrected color image 30A, a color image after IR subtraction 30B, and an IR image, 30C.

For general background regarding IR subtraction, refer to patent document CN103686111A disclosing a method and device for correcting RGB-IR image sensor. Patent document CN113365034 discloses a color calibration method based on RGB-IR image sensor. US20140307098A1 describes extracting true color from a color and infrared sensor. JP2015204579A discloses an imaging apparatus in which RGB color pixels and IR infrared pixels are arranged in a Bayer shape.

US20170289466A1 discloses an image processing method, including: obtaining image data of a photographed original image, and obtaining ambient infrared intensity I that is used when the original image is photographed; obtaining infrared image data corresponding to I according to a preset correspondence between tested infrared intensity and infrared image data; obtaining corrected image data according to the image data of the original image and the infrared image data corresponding to I; and obtaining a corresponding corrected image according to the corrected image data, and outputting the corrected image.

US 2017/0163954 A1 discusses a realizable image quality improvement around a weighting processing unit that weights a pixel signal of the second pixel by the second weighting coefficient. An invisible light component generation unit generates, as a component of the invisible light within each of the pixel signals, a difference between the weighted pixel signal of the second pixel and the Summed value.

An RGB-IR imagining sensor, also commonly termed as an RGB-IR camera, generally has a color filter array (CFA) with dedicated pixels for both, visible and IR light. Pictures taken with such color filter array are represented by a 4×4 pixel pattern, FIG. 1D, wherein
R pixels are 2 out of 16,
G pixels are 8 out of 16,
B pixels are 2 out of 16,
IR pixels are 4 out of 16,
and such a picture is illustratively previously shown in FIG. 1A.

Importantly, with reference to a more popularly known 2×2 Bayer pixel pattern, FIG. 1B, which represents an ideal color picture,
IR pixels are considered to replace ONLY R pixels and B pixels, while G pixels remain intact.
B pixels are considered to replace some of R pixels.
There remains scope to further improve and generate the color images as well as IR images for respective functions, from RGB-IR images.

SUMMARY OF PRESENT INVENTION

The present invention deals in RGB-IR images/pictures as input images consisting of a 4×4 pixel pattern. A method to achieve this comprises:
1. Generate a RGB IR pixel pattern of an RGB IR image.
2. Predicting pixel values—An arithmetic described below to generate "lost" R and B pixels for each IR pixel and to generate "lost" IR pixel for each color pixel.
3. A calibration process, as described below, to establish pixel value of each color pixel as obtained from an RGB-IR sensor and as could be obtained from an RGB sensor—termed as AS IS and TO BE value of each color pixel.
4. To correct each color pixel so as to obtain true color value, obtainable from the RGB imaging sensor, from the obtained value from the RGB-IR imaging sensor, based on the calibration process.
5. Generate RGB pixel pattern and IR pixel pattern.
6. Generate RGB image and IR image therefrom.

In the RGB-IR 4×4 pixel pattern, pixel boxes which are pointed by a start of an arrow line are "contamination pixels" which need to be predicted and replaced; based on the pixel box where the arrow line is originating from. In the RGB 2×2 pixel pattern, such pixel boxes are replaced by [C]x, where [C] is color R, or color B. An entirely new ONLY IR pixel pattern is generated by the present invention.

An R-pixel value which replace a B contamination pixel is derived by linearly interpolating the neighboring R pixel values. A B.pixel value which replaces an IR contamination pixel is derived by linearly interpolating the neighboring B pixel values. Each IR pixel values that replace R, G and B pixel location in the IR image is determined by linearly interpolating the neighboring IR pixel values.

Thus are obtained Bayer patterns, however, each and every values of R, G and B pixels are contaminated with IR light. Each such contaminated pixel value of R, G and B pixels is corrected by an IR subtraction function, based on a calibration process comprising
Preparing a set-up of calibration equipment
Coining a lighting strategy
Capturing images as per the lighting strategy
Generating IR subtraction function
Lighting is an important aspect of calibration and understanding including indoor as well as outdoor lighting. Indoor implies artificial lights like incandescent, Halogen, CFL, LED, et cetera including artificial lights under different color temperatures for indoors. Indoor particularly implies infra illumination between 940 nm and 850 nm of wavelength and with intensity control. Outdoor implies Sunlight at various times of the day, moonlight.

A reference object along with optionally a common object is photographed simultaneously by an RGB-IR camera and an RGB camera, in the plurality of prescribed light combinations.

For each captured image an arithmetic difference between
$R_{avg}$ and $R_{avgw}$,
$G_{avg}$ and $G_{avgw}$,
and
$B_{avg}$ and $B_{avgw}$,
is calculated and tabulated along with corresponding IRavg
The equations obtained are:

$$EqnR = Mr*IR[i] + Cr$$

$$EqnG = Mg*IR[i] + Cg$$

$$EqnB = Mb*IR[i] + Cb$$

Wherein,

Mr, Mg and Mb are the slope values obtained from the linear equation for the colors red, green and blue respectively.

Cr, Cg and Cb are the constant values obtained from the plots of the linear equation for the colors red, green and blue respectively, which are an intercept value either on X-axis (35X) or on Y-axis (35Y), when the straight lines are extended toward an origin of the respective plots.

IR[i] is the interpolated IR value in each pixel location i.

Based on above linear progression modelling, a true color image without IR effect, though obtained from an RGB-IR camera is generated by following formulae:

$$R_{new}[i] = R_{old}[i] - (EqnR)$$

$$G_{new}[i] = G_{old}[i] - (EqnG)$$

$$B_{new}[i] = B_{old}[i] - (EqnB)$$

wherein $R_{new}$, $G_{new}$ and $B_{new}$ are the new pixel values of RGB Bayer image generated by the present invention with IR effect removed

[i] is the pixel position of the image $R_{old}$, $G_{old}$, $B_{old}$ are the old pixel values of RGB Bayer image with IR effect EqnR, EqnG, EqnB is the subtraction function obtained from the Calibration process, applicable for a particular version of an RGB-IR camera with a prescribed dual pass filter. Also termed as calibrated IR contents, IR correction values and IR correction signals interchangeably.

Such color and IR images in the 2×2 pixel Bayer RGGB pattern are further processed in a known Image Signal Processor (ISP) for generic picture qualities including luminous parameters namely brightness, contrast, etc. and then RGB capture is sent as YUV to a known MIPI/USB processor communicating on a Mobile Industry Processor Interface (MIPI) or a USB protocol for display or further application.

The method described above is deployed as a system as per present invention, to produce an enhanced color image of Bayer 2×2 pixel pattern and an enhanced IR image, from a color image of 4×4 pixel color pattern, the system comprising:

a. An RGB IR camera with a dual pass filter permitting visible light and infra-red light b. An integrated circuit device configured to
   i. Predict missing R, G, B and IR pixel to convert 4×4 pixel patterns to 2×2 Bayer color patterns and IR patterns
   ii. Correct each R, G, B pixel of the 2×2 Bayer color patterns by an calibrated IR subtraction function c. An image signal processor configured to
   i. receive the 2×2 Bayer color patterns to produce the enhanced color image
   ii. receive the IR patterns to produce the enhanced IR image d. A Host Processor to process and display the enhanced color images of Bayer 2×2 RGGB pattern and IR images.

The system further comprising a set of executable instructions residing in the integrated circuit device, the executable instructions execute the steps of:

Receiving an image from a RGB-IR camera sensor in a 4×4 pixel pattern

Breaking the 4×4 RGB-IR pattern to 2×2 RGB Bayer pattern and IR pixels pattern

Subtracting IR from each of R, G and B pixels, as per a set of look up tables based on a set of linear equations, described above.

A preferred embodiment deploys a Field Programmable Gate Array (FPGA) as the integrated circuit device. Essentially, the FPGA handles the 4×4 RGB-IR pixel pattern, which the known image signal processors are incapable of, and "splits" the 4×4 pixel pattern to 2×2 color and IR pixel patterns, which are then further processed by the known signal processors as per prior art. Image data received from the Image signal processor may be in various formats, such as YUV for RGB signals.

The field-programmable gate array (FPGA), being one of an integrated circuit particularly designed to be configured in field, since FPGAs contain an array of programmable logic blocks, thus the term field-programmable, are most appropriate hardware for the present invention. The IR subtraction functions generated as per the present invention described above reside as a look up table in a look up table unit (LUT). A Digital Signal Processors (DSP) unit is capable of receiving real-world signals like voice, audio, video, optical, temperature, pressure, or position that have been digitized and then mathematically manipulate them. A DSP, as is known, is designed for performing mathematical functions like "add", "subtract", "multiply" and "divide" very quickly. The FPGA is integrated with its own random access memory (RAM), an input interface hardware and an output interface hardware. Such apt integrated circuit device as the FPGA as described is optimally deployed in the present invention for an economical and robust solution.

BRIEF DESCRIPTION OF DRAWINGS

The patent or application file contains at least one drawing executed in color. Copies of this patent or patent application publication with color drawing(s) will be provided by the Office upon request and payment of the necessary fee.

FIG. 14 is a functional block diagram of a field programmable graphics array in the present invention, while

DETAILED DESCRIPTION OF THE INVENTION

The term "RGB–IR" image is used in the detailed description to indicate an image which consists correspondingly of red, green, blue color and infra-red (IR) light regions, and thus it more correctly implies "RGB+IR" image.

A 4×4 pattern when mentioned in the detailed description implies a pattern which represents an image with a minimum pixel group of 4×4=16 pixels and has dedicated pixels for red, green, blue as well as IR light. Images or pictures captured with filters capturing these four constituents is formed by repeating minimum pixel group of 16 pixels. A 2×2 pattern, on the other hand implies a pattern which is interpreted with a minimum pixel group of 2×2=4 pixels, also known as a Bayer pattern, and has dedicated pixels for red, green and blue light only. Images or pictures captured with filters capturing these three constituents is formed by repeating minimum pixel group of 4 pixels.

Terms "imaging sensor" and "camera" are used interchangeably.

Figure 1A:
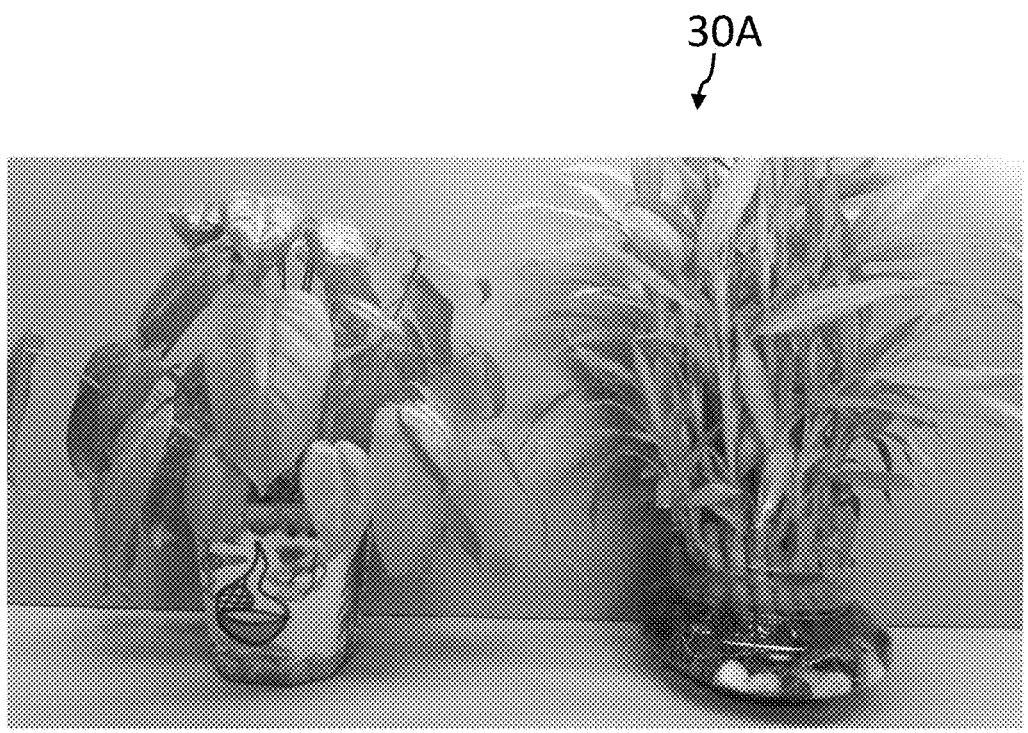
FIGS. 1A-1C are illustrations of RGB-IR image, RGB image and IR image of an object.
Figure 1B:
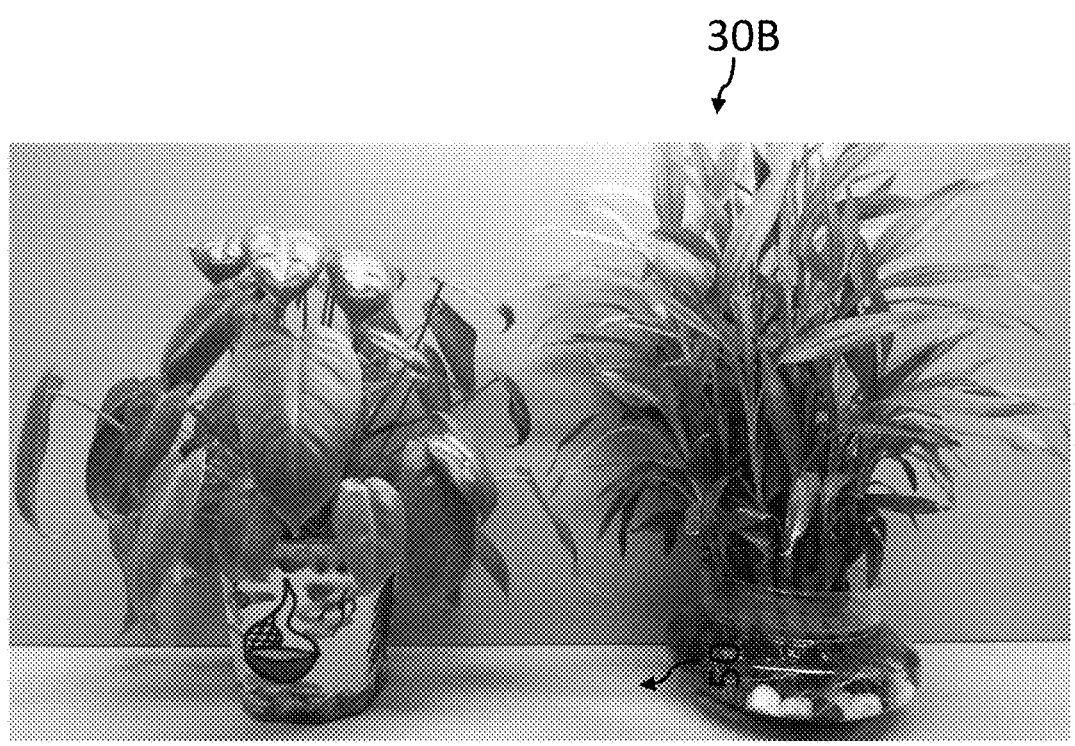
Figure 1C:
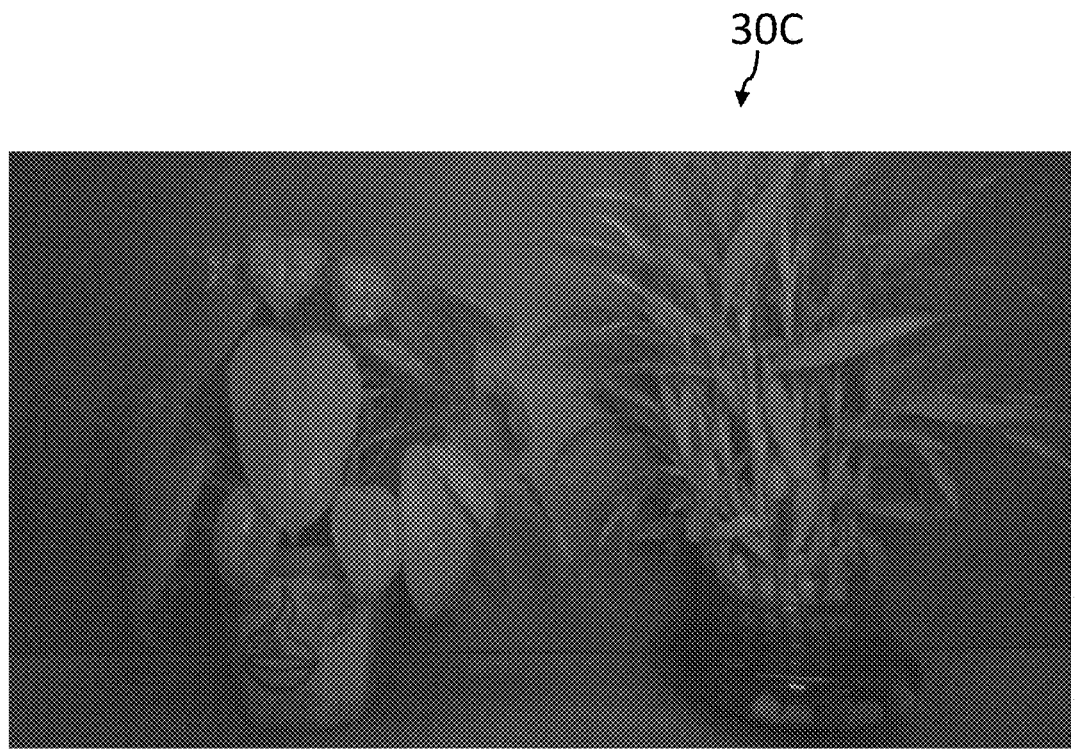
Figure 2:
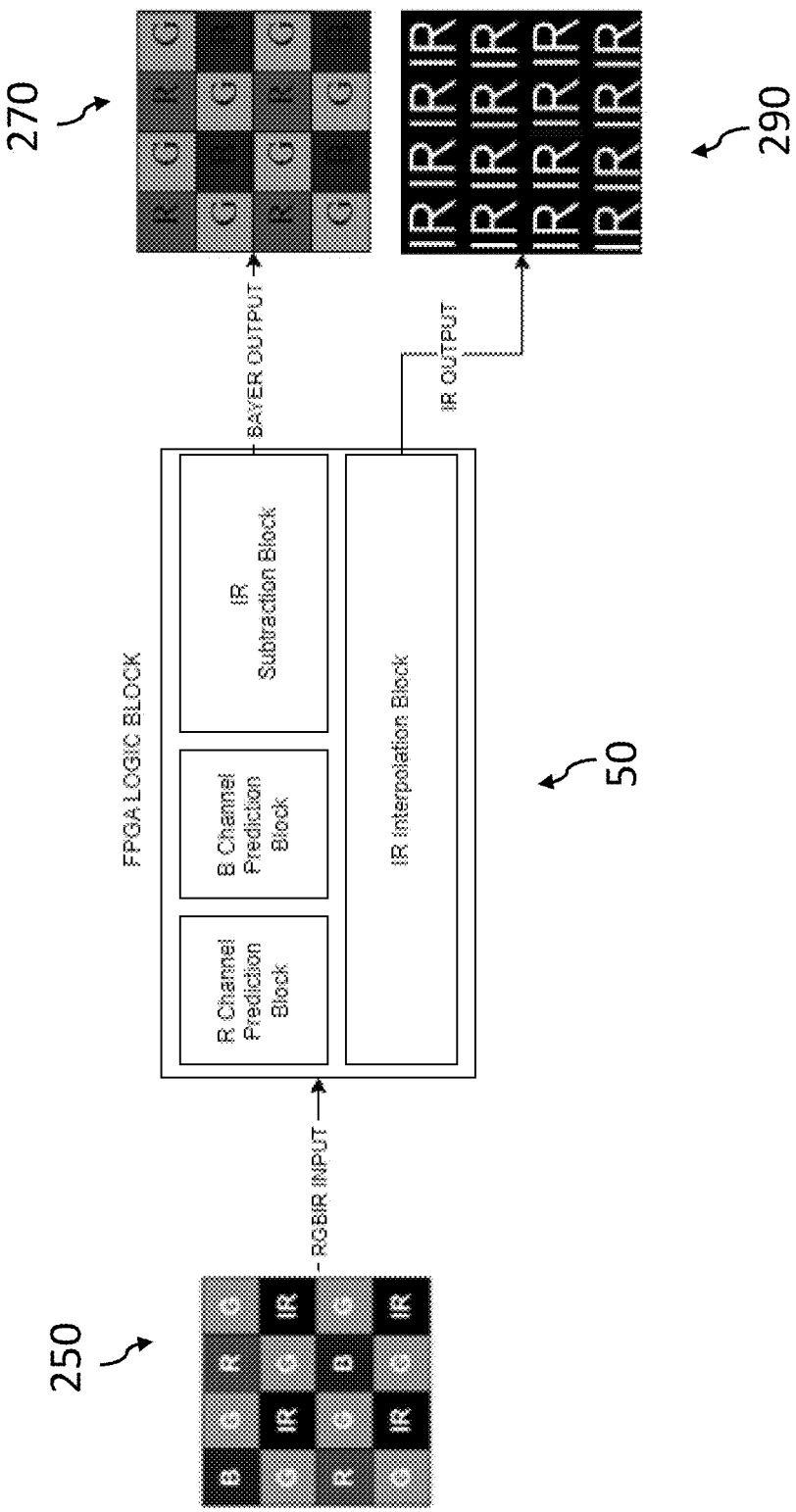
FIG. 2 is a block diagram of input image pixels and output image pixels.

FIG. 2, the present invention deals in RGB-IR images/pictures as input images consisting of a 4×4 pixel pattern (250) illustratably relatable to FIG. 1A; and produces a corresponding 2×2 RGGB pixel pattern (270) image of true colors, and a corresponding IR pixel pattern (290) image as desired output which are illustratively understandable with FIG. 1B and FIG. 1C respectively. It is easy to appreciate that the image captured by an RGB-IR imaging sensor (40, FIG. 13) has both information—complete color information and IR information; and the present invention separates them by deploying an integrated circuit device (50) having an inventive software and hardware combination solution.

Figure 3:
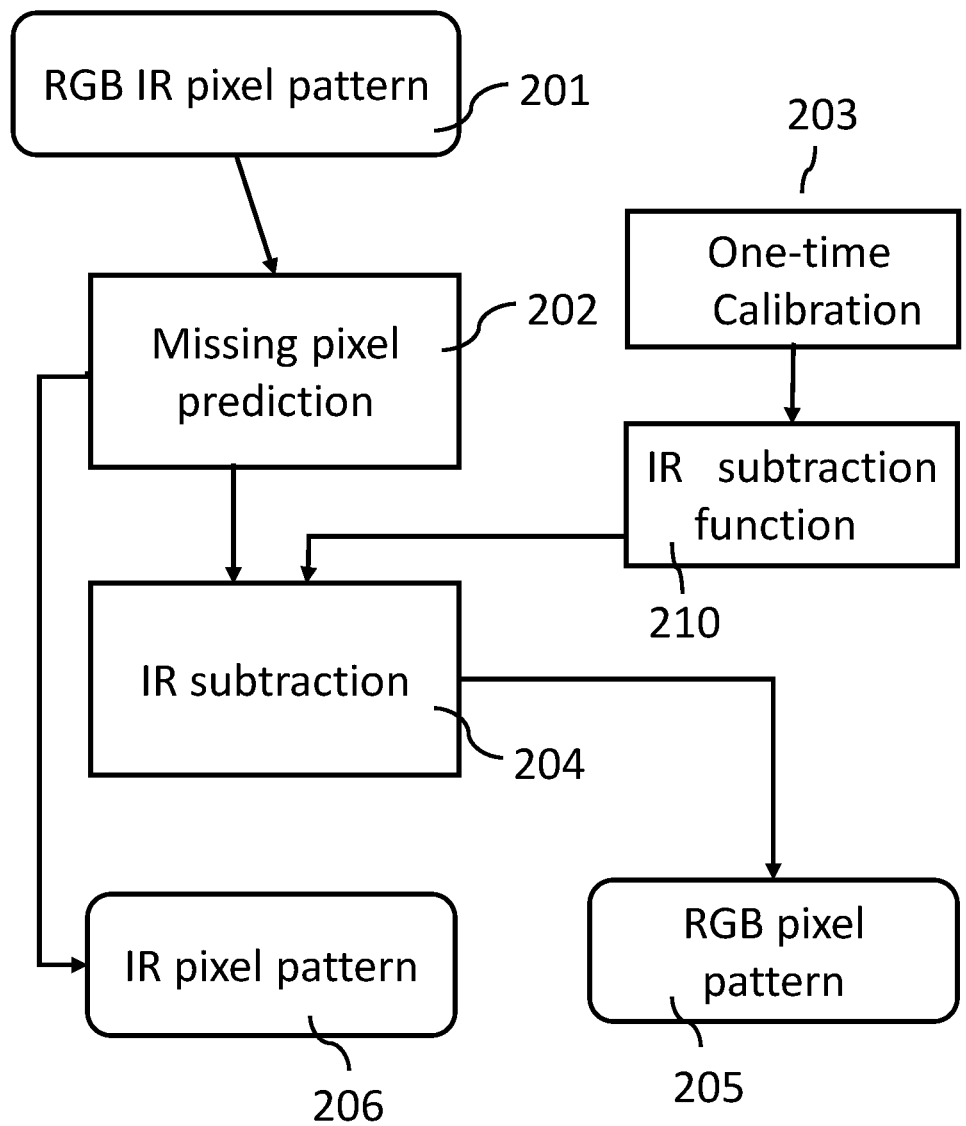
FIG. 3 is a flow chart of the present inventive method.

FIG. 3, the inventive method to achieve this objective comprises:
1. Generate a RGB IR pixel pattern (201) of an RGB IR image.
2. Predicting pixel values (202)—An arithmetic described below to generate "lost" R and B pixels for each IR pixel and to generate "lost" IR pixel for each color pixel.
3. A calibration process (203), as described below, to establish pixel value of each color pixel as obtained from an RGB-IR sensor and as could be obtained from an RGB sensor—termed as AS IS and TO BE value of each color pixel.
4. To correct each color pixel (204) so as to obtain true color value, obtainable from the RGB imaging sensor, from the obtained value from the RGB-IR imaging sensor, based on the calibration process (203).
5. Generate RGB pixel pattern (205) and IR pixel pattern (206).
6. Generate RGB image and IR image therefrom.

Figure 4A:
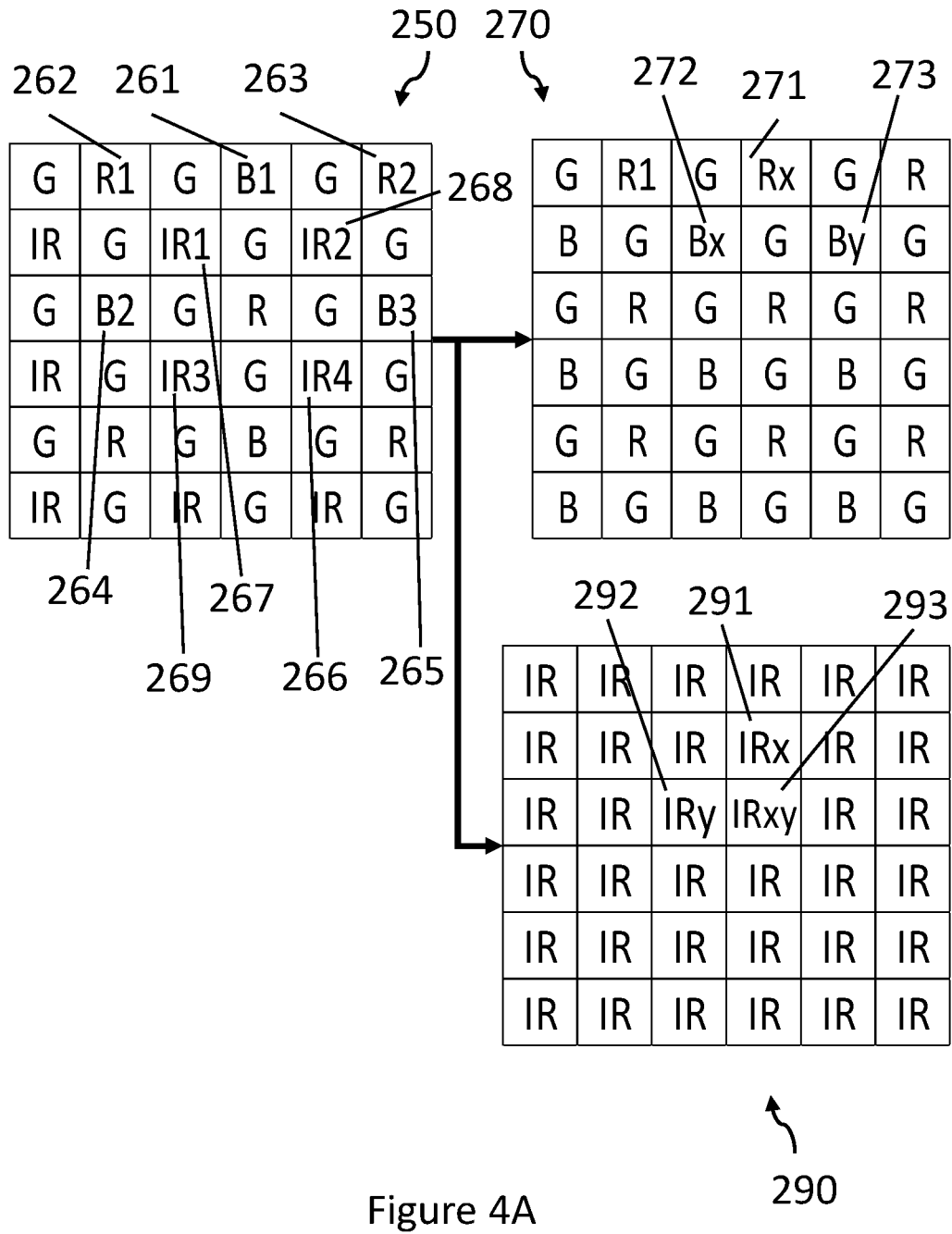
FIGS. 4A-4D are matrices of input pixels and output pixels details and predicting replacement pixels.
Figure 4B:
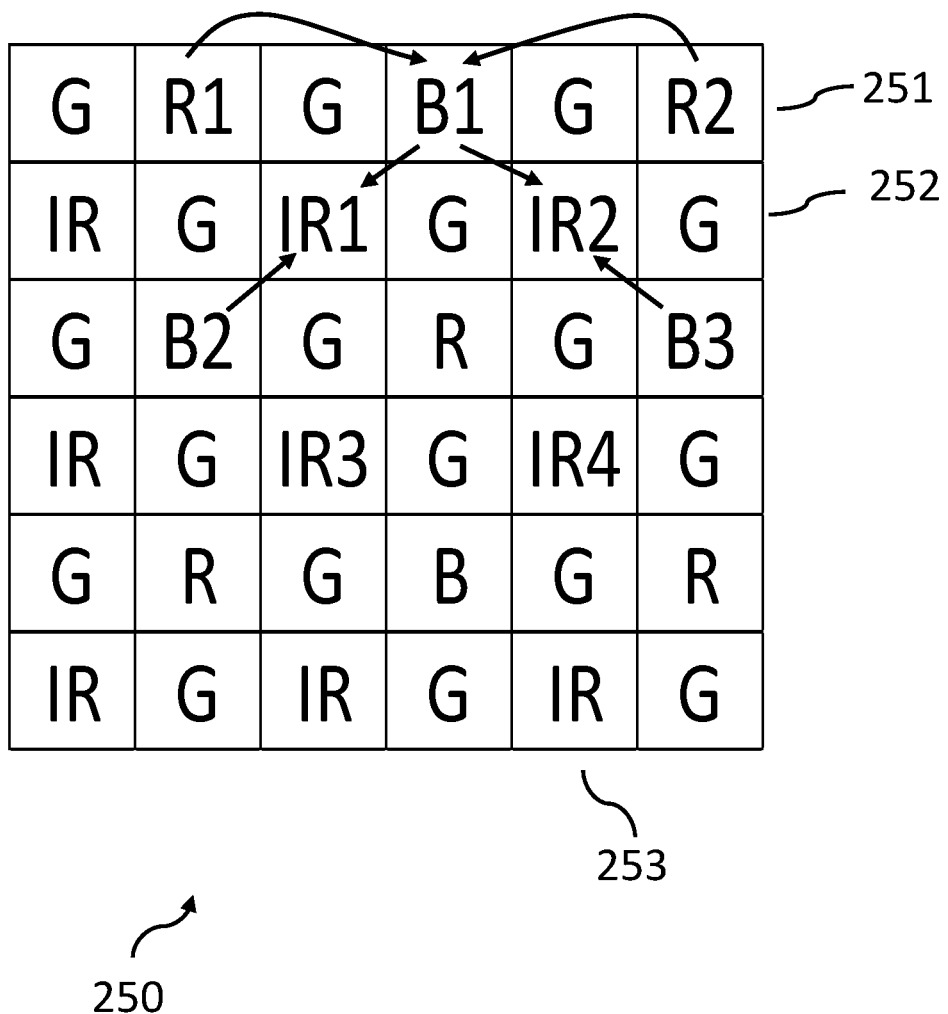

FIG. 4A, 4B, predicting pixel values (202) for missing R, B and IR pixels as per the present invention involves following steps:

In the RGB-IR 4×4 pixel pattern (250), pixel boxes which are pointed by a start of an arrow line are "contamination pixels" which need to be predicted and replaced; based on the pixel box where the arrow line is originating from.

In the RGB 2×2 pixel pattern (270), such pixel boxes are replaced by [C]x, where [C] is color R, or color B An entirely new ONLY IR pixel pattern is generated by the present invention.

a. R Pixels Prediction:

An $R_x$ pixel (271) value which replace a B1 contamination pixel (261) is derived by linearly interpolating the neighboring R1 pixel (262) value and R2 pixel (263) value:

Arithmetically, $$R_x = (R1 + R2)/2$$

Thus, a predicted Rx pixel (271) is an arithmetic mean of R pixels situated on either side of a first horizontal row (251) of the 4×4 pixel color pattern. Such replacement is essentially replacing B pixels from each horizontal row of predominantly G and R pixels by a correspondingly predicted R pixels b. B Pixels Prediction:

A $B_x$ pixel (272) value which replaces an IR1 contamination pixel (267) is derived by linearly interpolating the neighboring B1 pixel (261) value and B2 pixel (264) value.

A $B_y$ pixel (273) value which replaces an IR2 contamination pixel (268) is derived by linearly interpolating the neighboring B1 pixel (261) value and B3 pixel (265) pixel value.

Arithmetically, $$B_x = (B1 + B2)/2$$

$$B_y = (B1 + B3)/2$$

Thus,
a predicted Bx pixel (272) is an arithmetic mean of B pixels situate diagonally on either side of the 4×4 pixel color pattern.
a predicted By pixel (273) is an arithmetic mean of B pixels situate diagonally on either side of the 4×4 pixel color pattern.

Such replacement is essentially replacing IR pixels from each horizontal row of predominantly IR and G pixels by a correspondingly predicted B pixels c. IR Pixels Prediction:

Each IR pixel values that replace R, G and B pixel location in the IR image (290) is determined by linearly interpolating the neighboring IR pixel values of an RGB IR pixel pattern as follows:

An $IR_x$ pixel (291) value is derived by linearly interpolating neighboring IR1 contamination pixel (267) value and IR2 contamination pixel (268) pixel value.

An $IR_y$ pixel (292) value is derived by linearly interpolating neighboring IR1 contamination pixel (267) value and IR3 contamination pixel (269) pixel value.

An $IR_{xy}$ pixel (293) value is derived by linearly interpolating neighboring IR1 contamination pixel (267) value, IR2 contamination pixel (268), IR3 contamination pixel (269) value and IR4 contamination pixel (266) value.

Arithmetically, $$IR_x = (IR1 + IR2)/2$$

$$IR_y = (IR1 + IR3)/2$$

$$IR_{xy} = (IR1 + IR2 + IR3 + IR4)/4$$

Figure 4C:
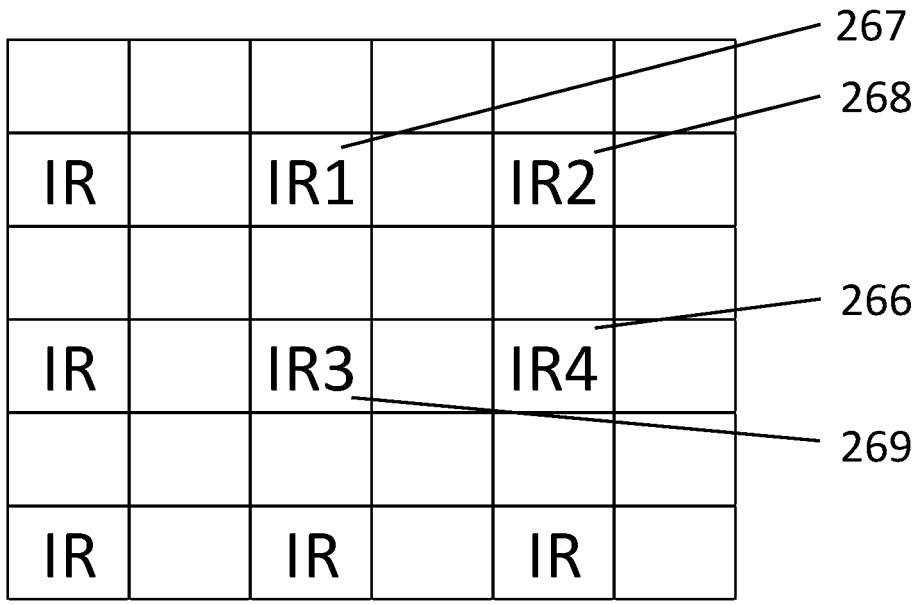
Figure 4D:
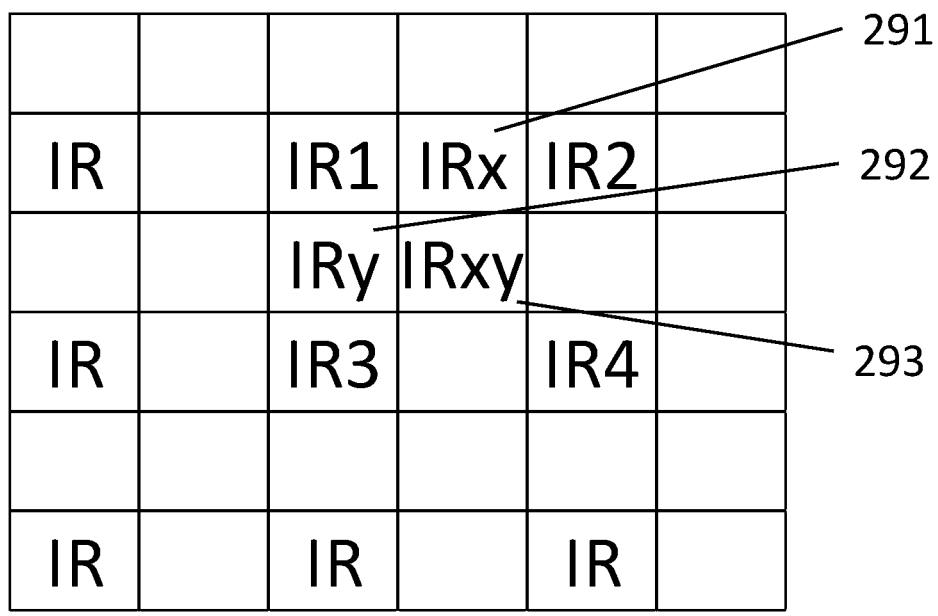

FIG. 4C, the IR pixels of RGB IR pixel pattern are such located that all "empty" pixel locations, that were occupied by R, G or B pixels in FIG. 4B, are predictable and generated by these three equations as can be gauged from FIG. 4D. Thus, a predicted IR pixel is an arithmetic mean of IR pixels situate on either side of a second horizontal row (252) of the 4×4 pixel color pattern, and or an arithmetic mean of IR pixels situate on either side of a corresponding vertical column (253) of the 4×4 pixel color pattern, or is an arithmetic mean of IR pixels situate on all four corners of the 4×4 pixel color pattern.

Similarly for the remainder of the image pixels, the RGB and IR pixel values in other locations are calculated and final RGB Bayer pixel pattern and an IR interpolated pixel pattern is obtained.

Thus are obtained Bayer patterns, however, each and every values of R, G and B pixels are contaminated with IR light. Each such contaminated pixel value of R, G and B pixels is corrected by an IR subtraction function (210), based on the calibration process described hereinbelow.

Calibration (203) to Determine the IR Subtraction Function (210)

Figure 5:
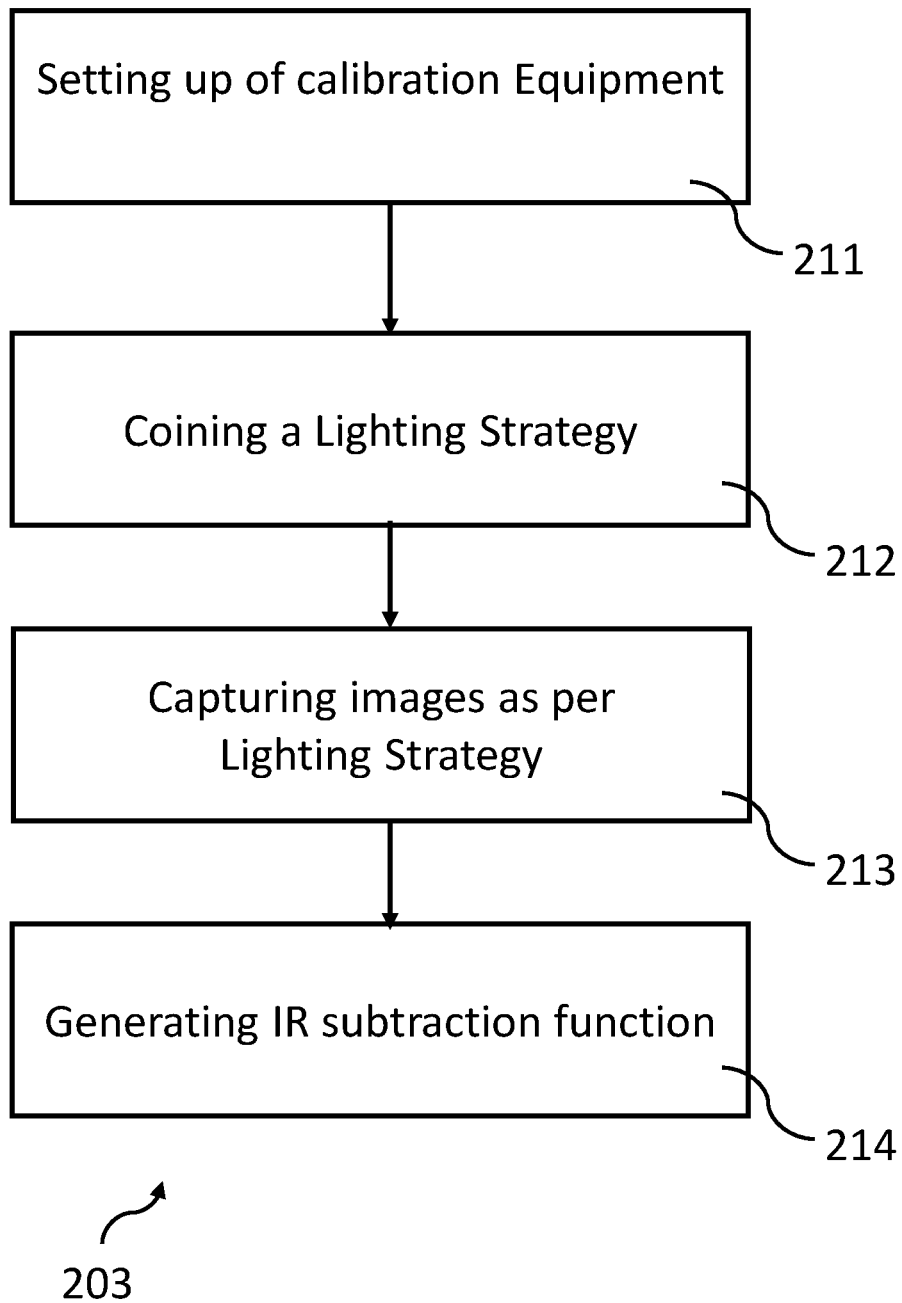
FIG. 5 is a flow diagram of a calibration process for the present invention.

FIG. 5, a Calibration process for and as per the present invention comprises
  Preparing a set-up of calibration equipment (211)
  Coining a lighting strategy (212)
  Capturing images (213) as per the lighting strategy (212)
  Generating (214) IR subtraction function (210)

Figure 6:
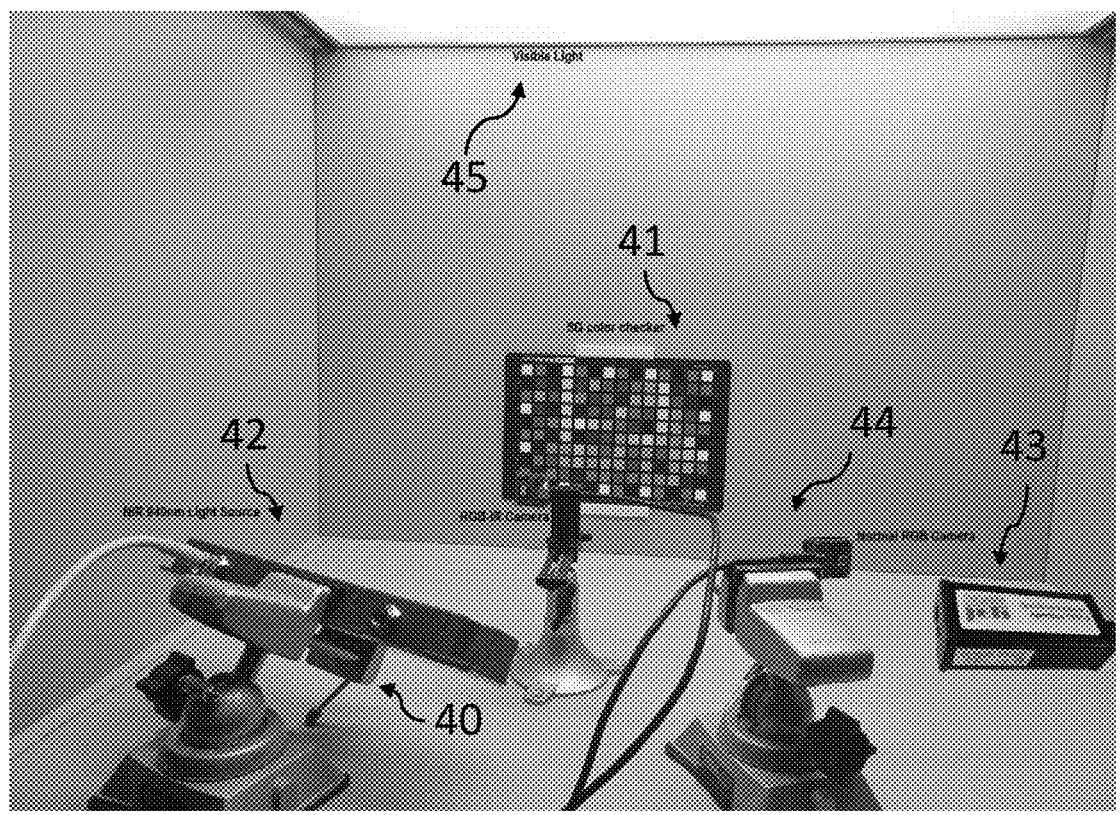
FIG. 6 is a calibration set-up.

FIG. 6, the set-up of calibration equipment (211) comprises
  A reference object (41)
  An RGB-IR camera (40)
  An RGB camera (44)
  An infra-red light source (42)
  A visible light source (45)
  A spectroscope (43)

The reference object (41) is a well-known X-Rite ColorChecker® classic chart or X-Rite ColorChecker® SG chart. The RGB-IR camera (40) deployed as per present invention has a lens with a visible light+near-infrared (VIS+ NIR) dual bandpass filter allowing light of wavelengths of up to 850 nanometer (850 nm) or 940 nanometer (940 nm). The RGB camera (44) has a lens with filter permitting only visible light and thus cutting all light of 700+ nanometer, generally termed as a 700+ NIR cut filter. A near infrared (NIR) sodium light source (42) is deployed. A spectroscope (43), illustratively, JETI© Spectroradiometer model specbos 1211-2, is deployed so as to measure and thereby facilitate control light conditions, to be able to develop an accurate IR subtraction function and arrive at a precise calibration.

Lighting Strategy (212)

Lighting is an important aspect of calibration and understanding including indoor as well as outdoor lighting.

Indoor implies artificial lights like incandescent, Halogen, CFL, LED, et cetera including artificial lights under different color temperatures for indoors. Indoor particularly implies infra illumination between 940 nm and 850 nm of wavelength and with intensity control.

Outdoor implies Sunlight at various times of the day, moonlight.

For indoor environment, for each type of light used and color temperature, the following combination of images are taken:
  Images with visible light without separate NIR illumination
  Images with visible light with NIR illumination 850 nm or 940 nm
  Images with a variable irradiance of light, illustratively from 1 mW/(sr m^nm) to 30 mW/(sr m^nm) in steps of 5 mW/(sr m^nm), wherein "mW/(sr m^nm)" implies milli Watt per square meter for a unit steradian of solid angle per nano meter wavelength.

For outdoor environment, for different times of the day, a combinations of images are captured with both 700 nm+ NIR cut filter, and VIS+ NIR dual bandpass filter 850 nm or 940 nm; chosen based on the NIR illumination used.

In the captured images, the part containing chart is cropped and used for further computations.

Illustratively, following light conditions are sequentially applied on the reference object (41), mixed in different permutations and combinations, and with infra light of varying intensity.
  1. Cool White Fluorescent (CWF)—a wide band fluorescent source emitting relatively high amounts of green and very little red energy.
  2. Light of the neon fluorescent type TL84—the classic neon light, the typical "department store lighting", TL84 represents a three-band fluorescent lamp with 4000 Kelvin. The 4000K color temperature range for LEDs is "neutral white". This color range produces a balanced color tone, not too blue and not too yellow.
  3. Ultralume 30 (U30)—A narrow band tri-phosphor fluorescent source with color temperature 3000K.

Figure 7A:
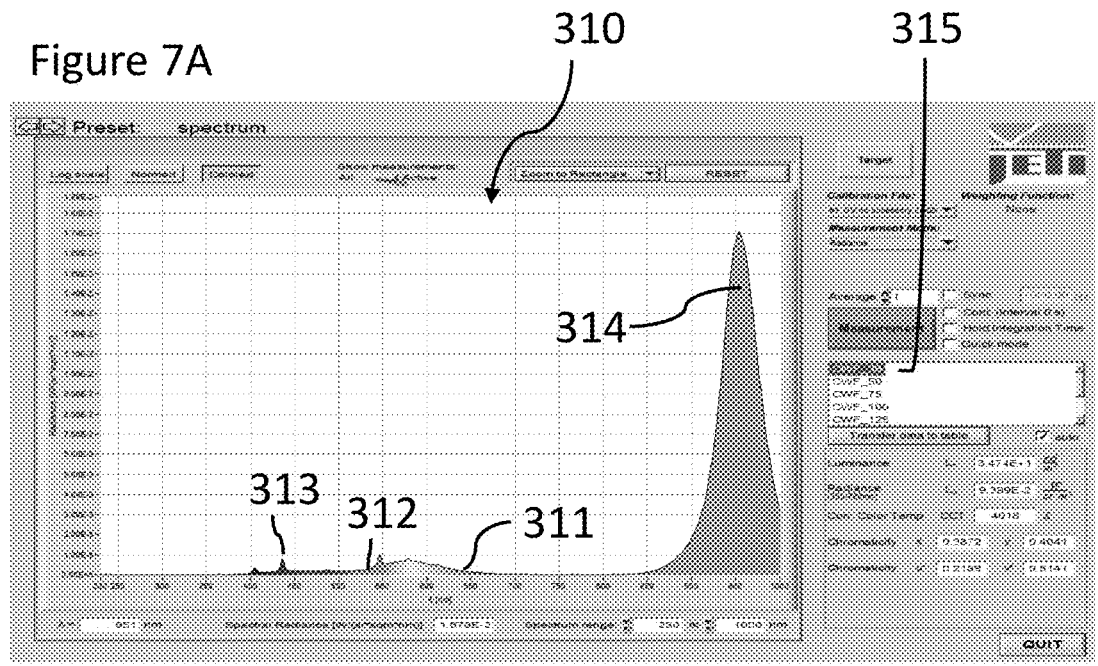
FIGS. 7A-7B, 8A-8B are illustrative spectrums of lighting conditions for calibration.

A few illustrations of light conditions measured and displayed on the spectroscope (43) deployed for the calibration process as per the present invention include:

FIG. 7A, spectrum (310) of constituent red light (311), green light (312), blue light (313) of a cool white fluorescent (CWF) light (315) of a prescribed temperature with infra-red light (314) of high intensity.

Figure 7B:
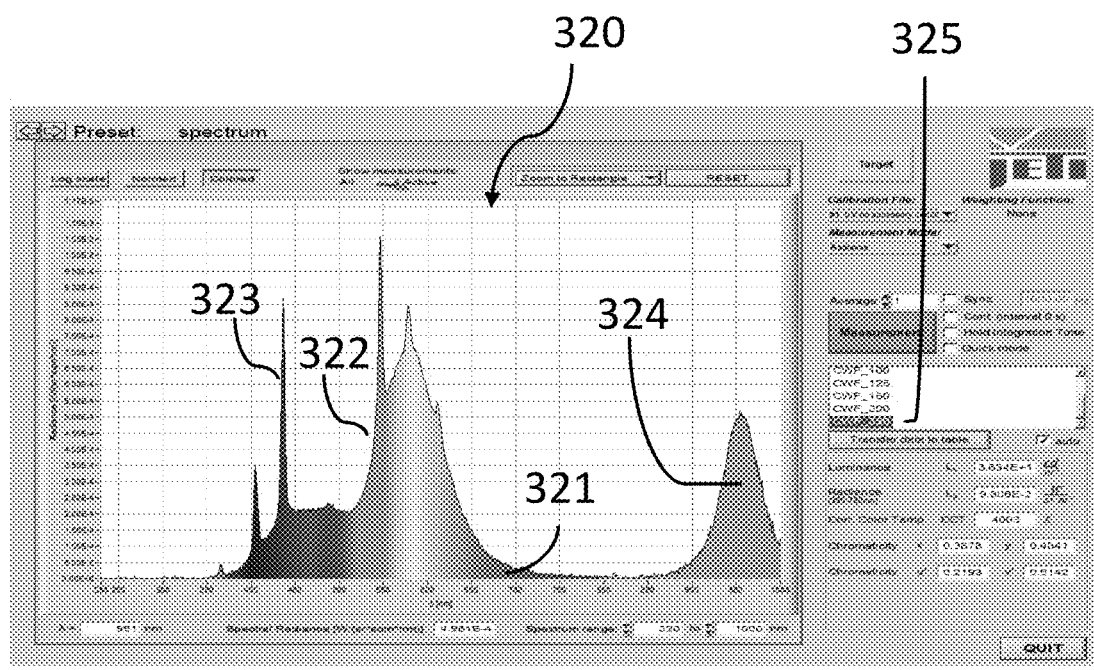

FIG. 7B, spectrum (320) of constituent red light (321), green light (322), blue light (323) of the cool white fluorescent (CWF) light (325) of the prescribed temperature, along with infra-red light (324) of low intensity.

Figure 8A:
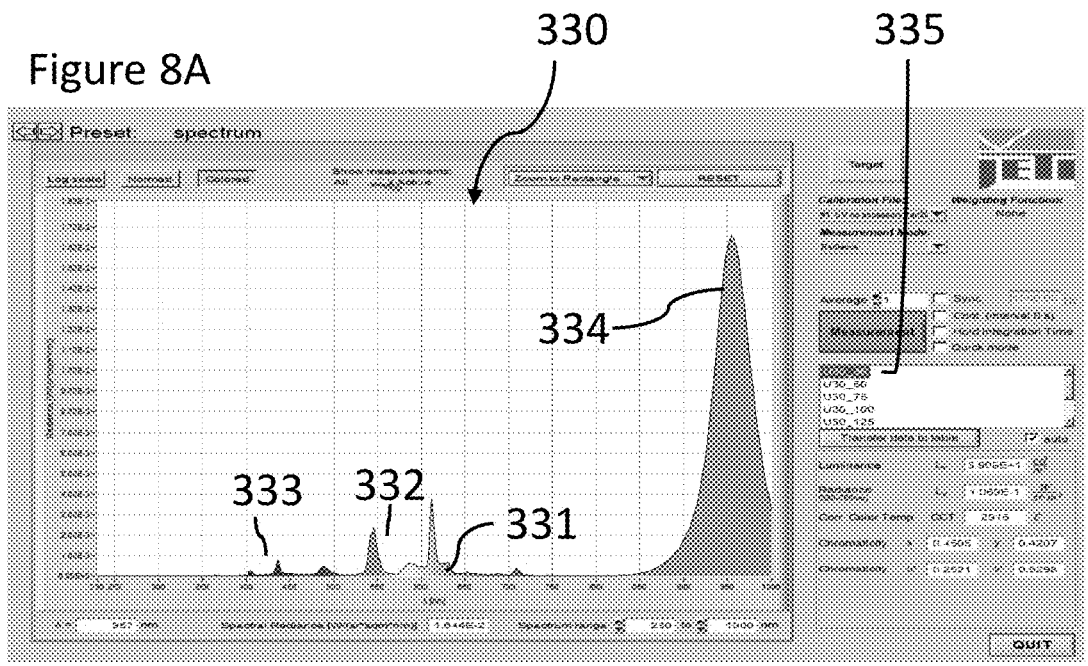

FIG. 8A, spectrum (330) of constituent red light (331), green light (332), blue light (333) of a Ultralume 30 (U30) light (335) of a prescribed temperature, along with infrared light (334) of high intensity.

Figure 8B:
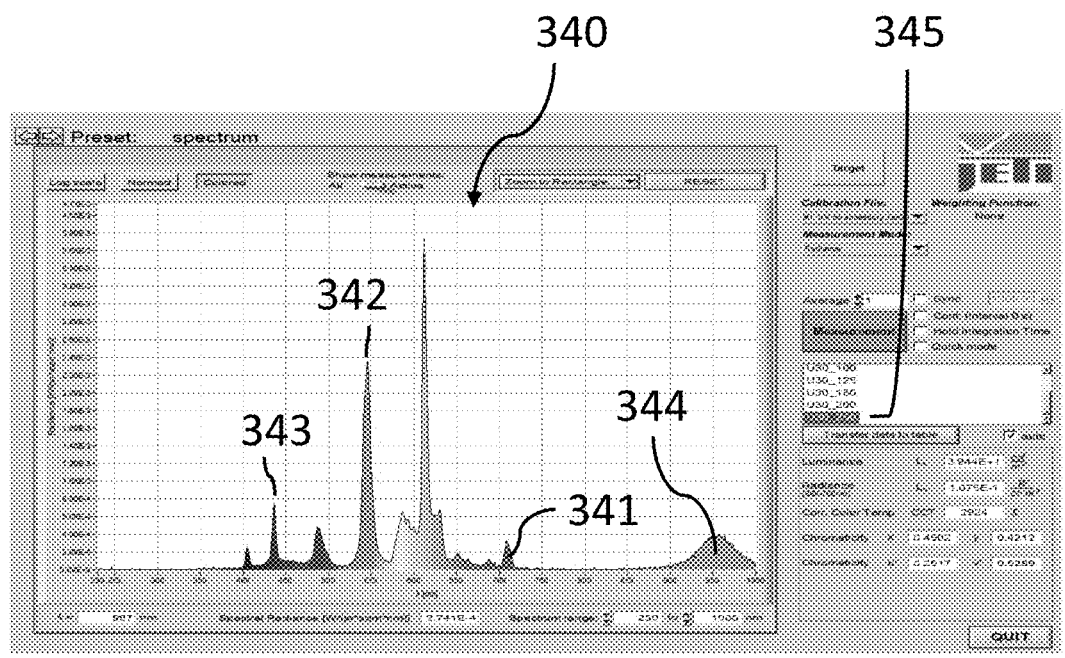

FIG. 8B, spectrum (340) of constituent red light (341), green light (342), blue light (343) of the Ultralume 30 (U30) light (345) of the prescribed temperature, along with infra-red light (344) of low intensity.

Capturing Images (213)

Figure 9A:
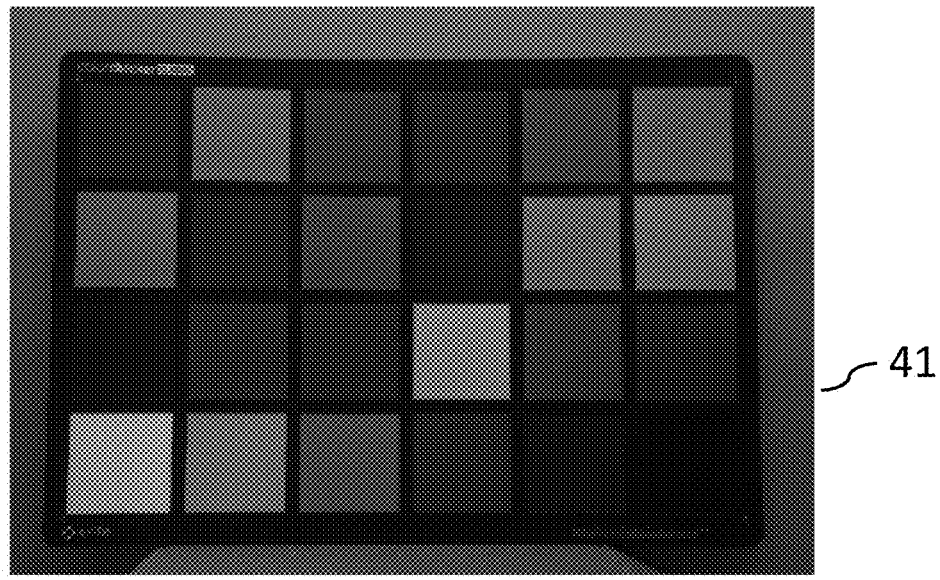
FIGS. 9A-9B are comparative images from RGB camera and RGB-IR camera for identical lighting conditions as per spectrum of FIG. 9C.
Figure 9B:
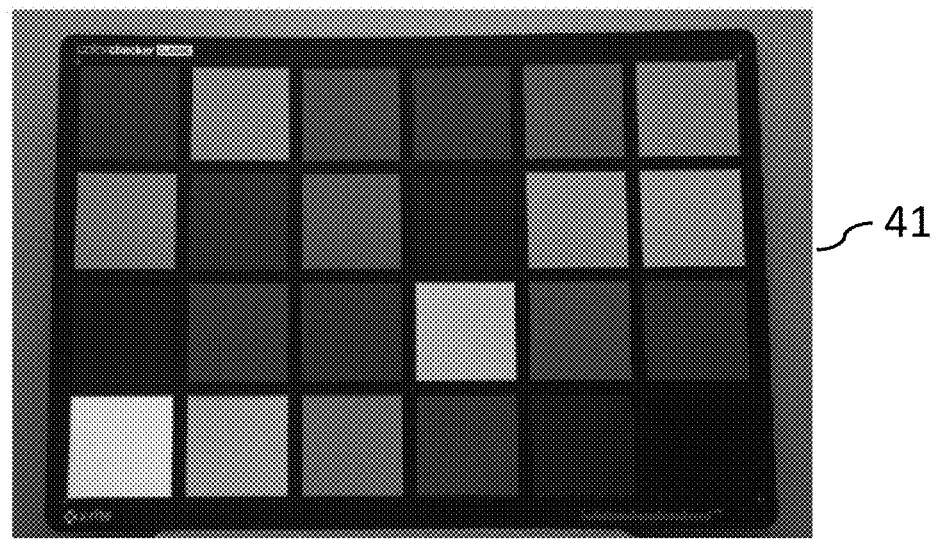
Figure 9C:
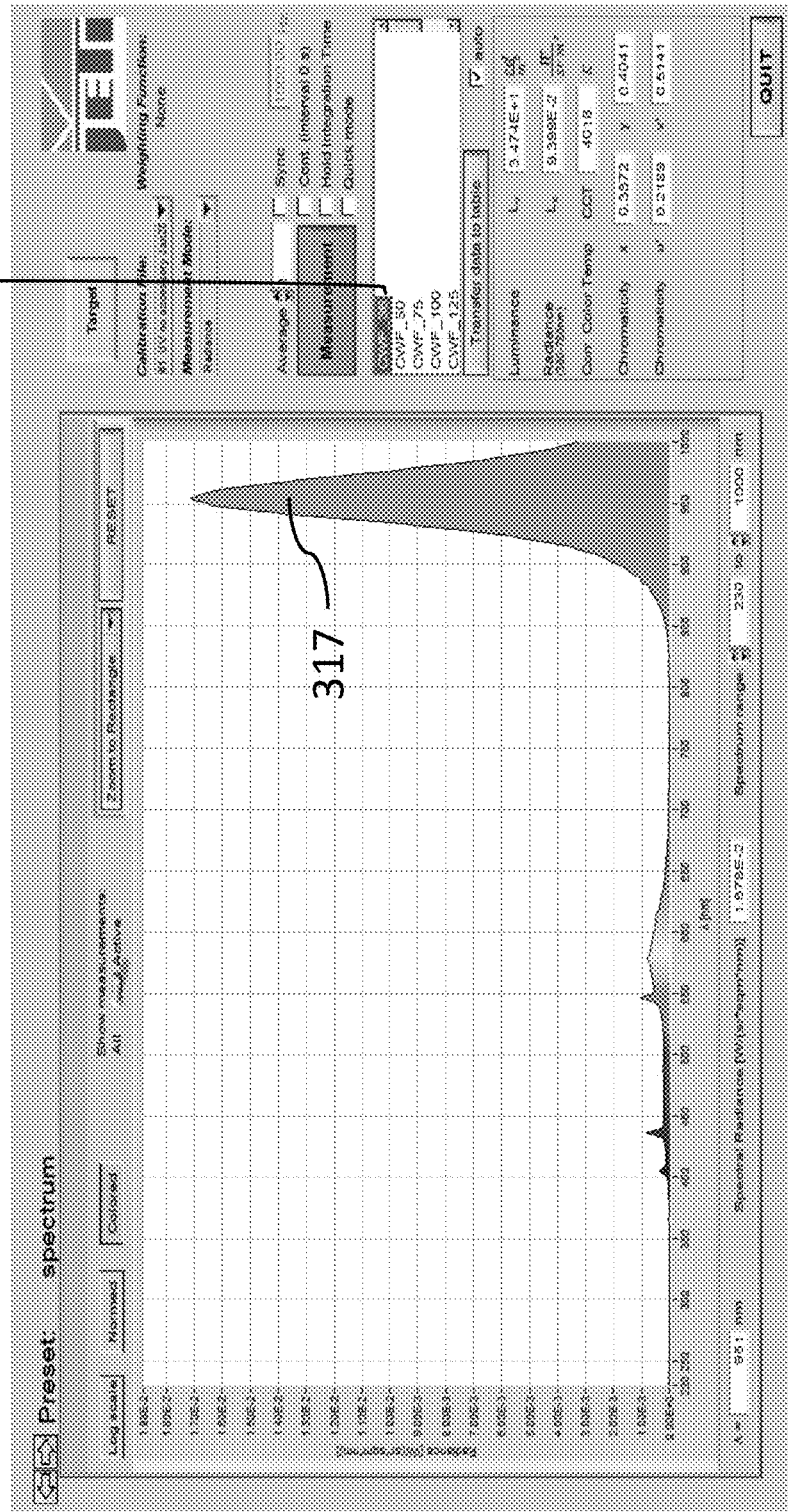

The reference object (41) along with optionally a common object is photographed simultaneously by an RGB-IR camera (40) and an RGB camera (44), in the plurality of above prescribed light combinations. FIGS. 9A and 9B shown on a single page pertain to a typical lighting combination, simultaneously captured by an RGB camera (FIG. 9A) and RGB-IR camera (FIG. 9B) respectively. FIG. 9C gives details of this typical lighting combination, which is a CWF light (316) along with infra-red light (317) of high intensity measured by the spectroscope (43).

Figure 10A:
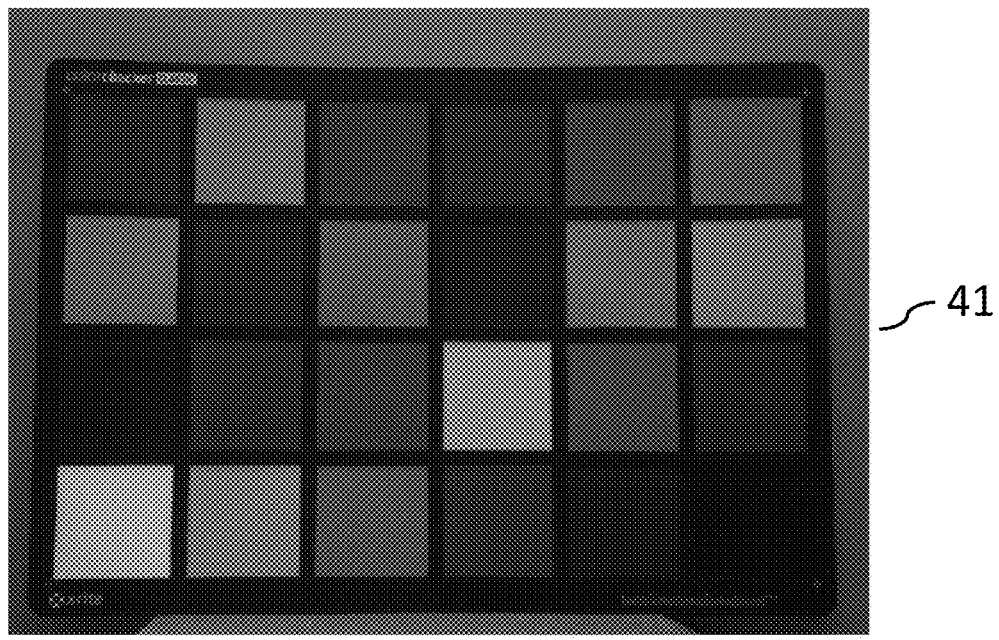
FIGS. 10A-10B are comparative images from RGB camera and RGB-IR camera for identical lighting conditions as per spectrum of FIG. 10C.
Figure 10B:
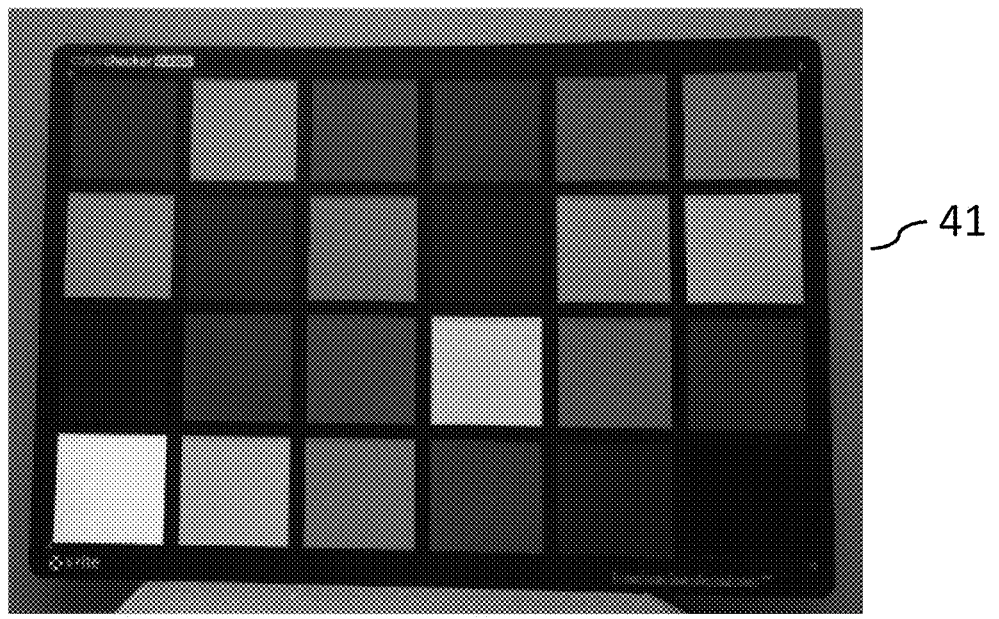
Figure 10C:
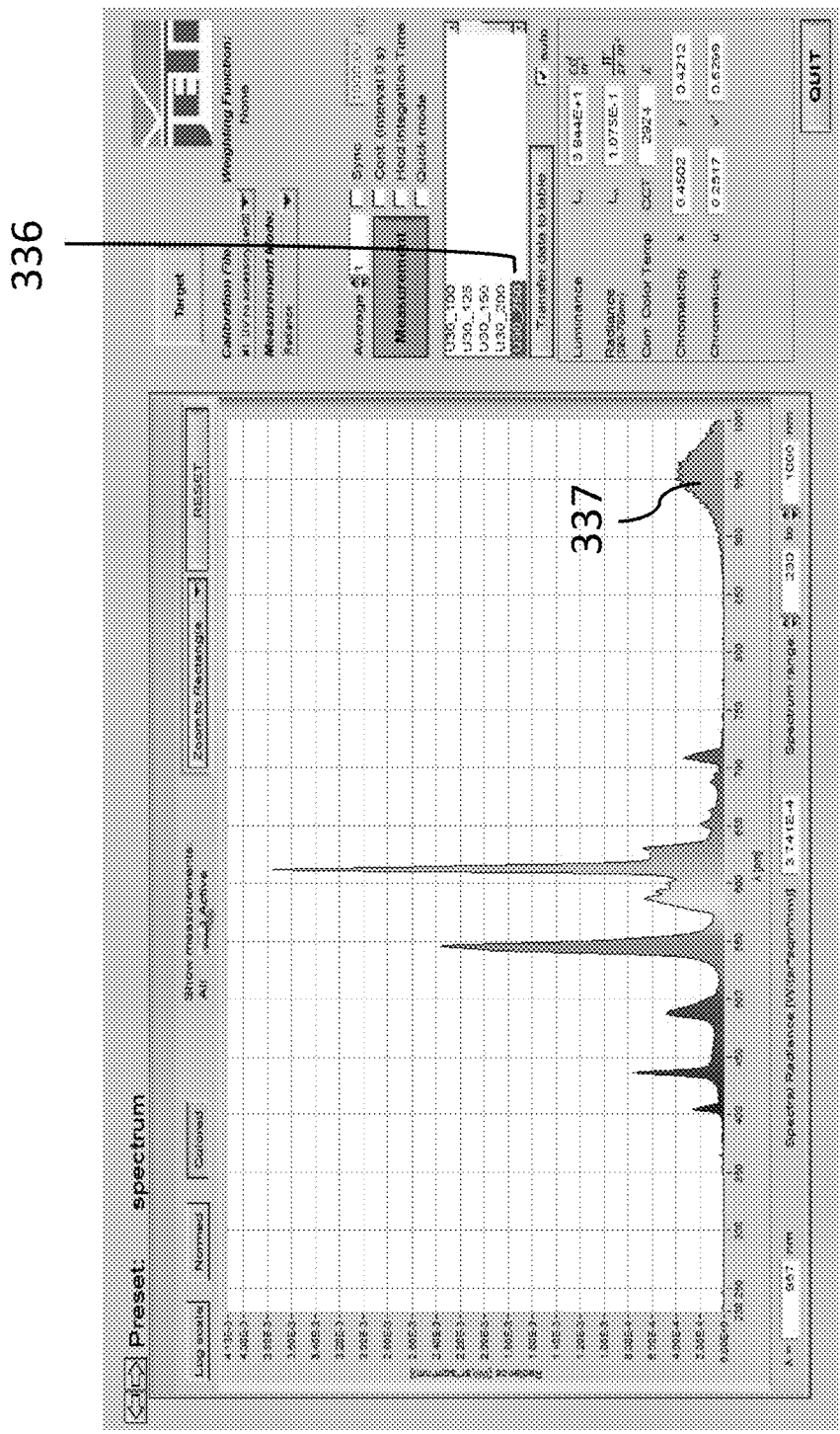

FIGS. 10A and 10B shown on a single page pertain to another typical lighting combination, simultaneously captured by an RGB camera (FIG. 10A) and RGB-IR camera (FIG. 10B) respectively. FIG. 10C gives details of this typical lighting combination, which is a UL30 light (336) with low IR intensity light (337) measured by the spectroscope (43). Qualitatively, uncorrected RGB-IR images of FIGS. 9B, 10B appear overall slightly brighter than true RGB images of FIGS. 9A, 10A, but with untrue colors.

Generating IR Subtraction Function (214)

The images captured containing the chart has pixels of all the channels R, G, B and IR. From the image data, following are worked out from each captured image—

$IR_{avg}$—an average value of all IR pixels of image data captured from image obtained from RGB-IR camera with VIS+ NIR dual bandpass filter.

$R_{avgw}$—an average value of all R pixels of image data captured from image obtained from RGB camera with 700 nm+ NIR cut filter.

$R_{avg}$—an average value of all R pixels of image data captured from image obtained from RGB-IR camera with VIS+ NIR dual bandpass filter.

Likewise, $G_{avgw}$—an average value of all G pixels of image data captured from image obtained from RGB camera with 700 nm+ NIR cut filter.

$G_{avg}$—an average value of all G pixels of image data captured from image obtained from RGB-IR camera with VIS+ NIR dual bandpass filter.

$B_{avgw}$—an average value of all B pixels of image data captured from image obtained from RGB camera with 700 nm+ NIR cut filter.

$B_{avg}$—an average value of all R pixels of image data captured from image obtained from RGB-IR camera with VIS+ NIR dual bandpass filter.

Figure 11A:
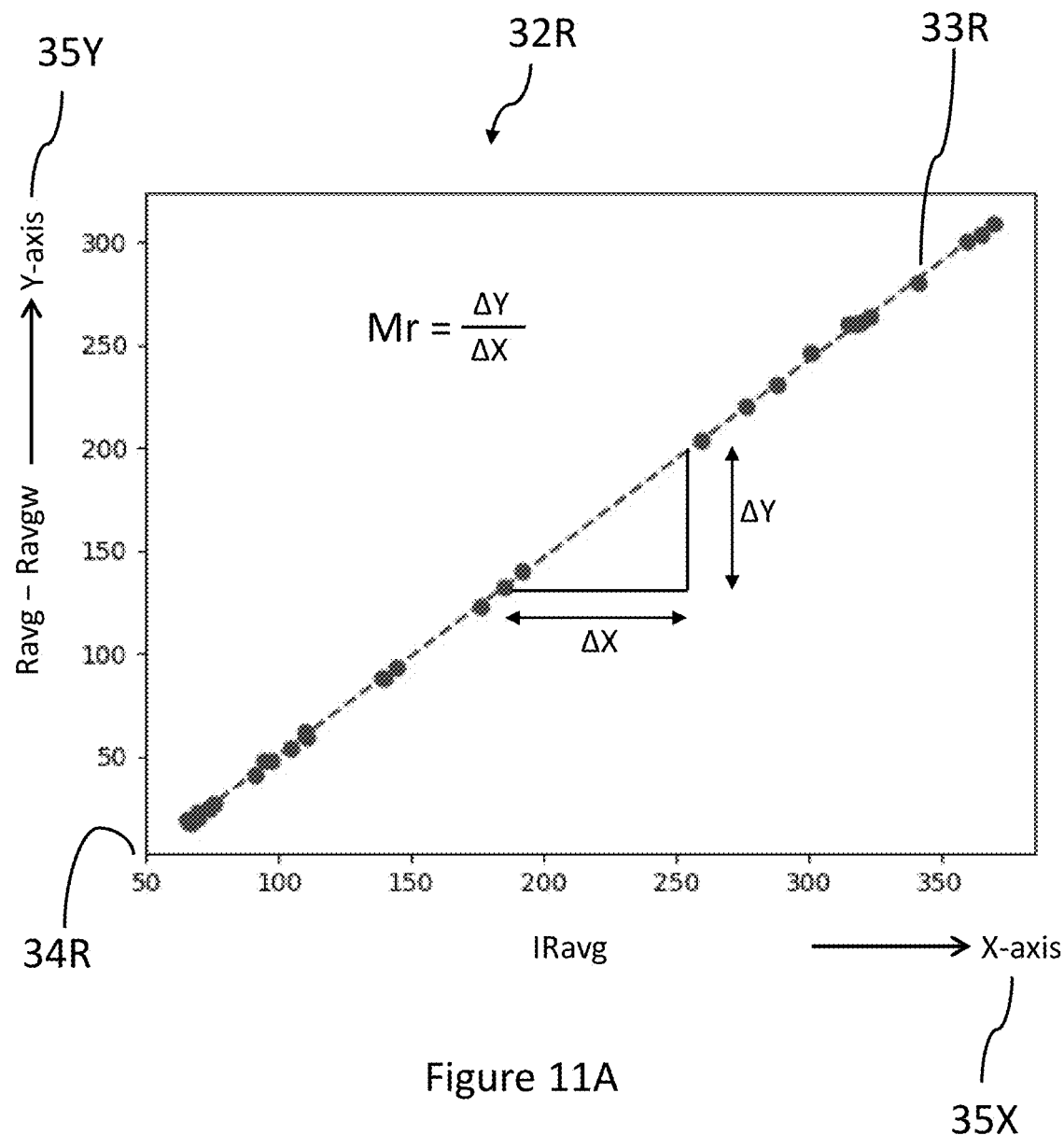
FIGS. 11A-11C are plots of data of images captured for calibration.

For each captured image has an arithmetic difference between $R_{avg}$ and $R_{avgw}$,
$G_{avg}$ and $G_{avgw}$,
and
$B_{avg}$ and $B_{avgw}$, is calculated and tabulated along with corresponding IRavg FIG. 11A, a values (IRavg, Ravg MINUS Ravgw) of red data each captured image is plotted (32R) on an X-Y plane. Such a plot (32R) results in a near straight line (33R) with a slope Mr and a Constant Cr, following a well-known arithmetic expression of a straight line Y=mX+C.

Figure 11B:
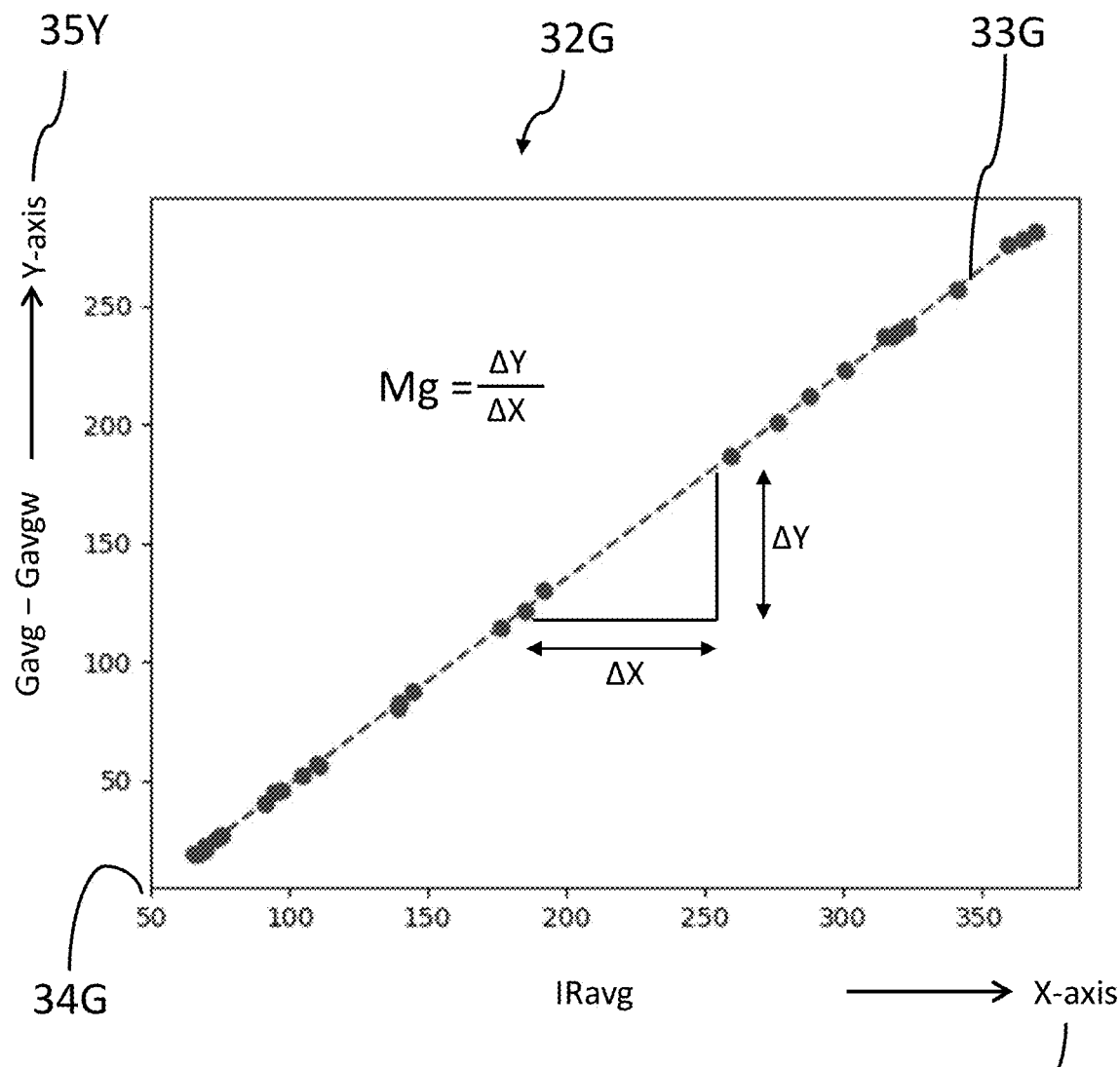
Figure 11C:
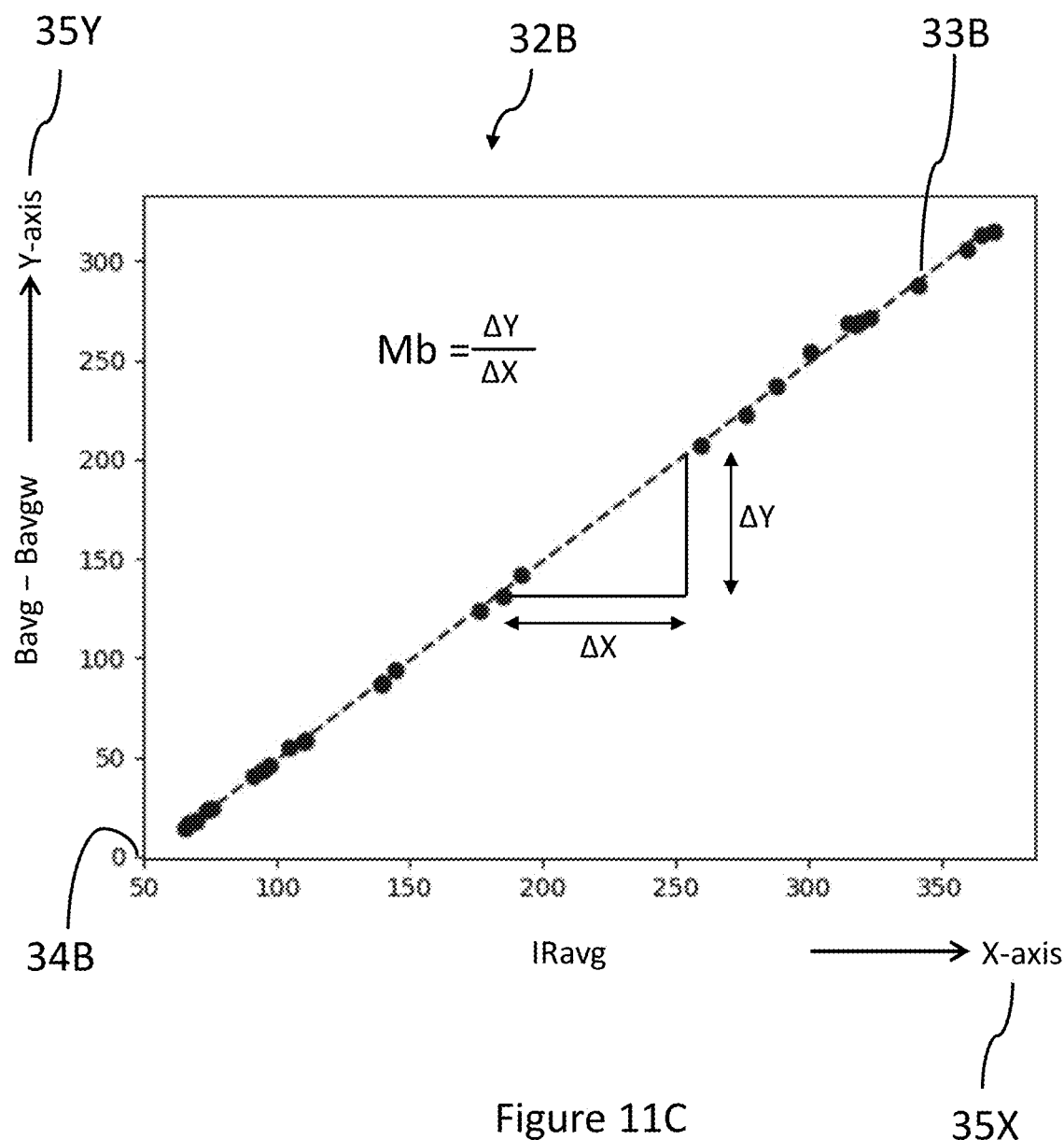

Likewise, FIG. 11B, a values (IRavg, Gavg MINUS Gavgw) of green data of each captured image is plotted (32G) on an X-Y plane. Such a plot (32G) results in a near straight line (33G) with a slope Mg and a Constant Cg; and FIG. 11C, a values (IRavg, Bavg MINUS Bavgw) of blue data of each captured image is plotted (32B) on an X-Y plane. Such a plot (32B) results in a near straight line (33B) with a slope Mb and a Constant Cb.

The equations obtained are:

$$EqnR = Mr*IR[i]+Cr$$

$$EqnG = Mg*IR[i]+Cg$$

$$EqnB = Mb*IR[i]-+Cb$$

Wherein,

Mr, Mg and Mb are the slope values obtained from the linear equation for the colors red, green and blue respectively.

Cr, Cg and Cb are the constant values obtained from the plots (32R, 32G, 32B) of the linear equation for the colors red, green and blue respectively, which are an intercept value either on X-axis (35X) or on Y-axis (35Y), when the straight lines (33R, 33G, 33B) are extended toward an origin (34R, 34G, 34B) of the respective plots.

IR[i] is the interpolated IR value in each pixel location i.

Based on above linear progression modelling, a true color image without IR effect, though obtained from an RGB-IR camera is generated by following formulae:

$$R_{new}[i] = R_{old}[i]-(EqnR)$$

$$G_{new}[i] = G_{old}[i]-(EqnG)$$

$$B_{new}[i] = B_{old}[i]-(EqnB)$$

wherein $R_{new}$, $G_{new}$ and $B_{new}$ are the new pixel values of RGB Bayer image generated by the present invention with IR effect removed

[i] is the pixel position of the image $R_{old}$, $G_{old}$, $B_{old}$ are the old pixel values of RGB Bayer image with IR effect EqnR, EqnG, EqnB is the subtraction function obtained from the Calibration process, applicable for a particular version of an RGB-IR camera with a prescribed dual pass filter. Also termed as calibrated IR contents, IR correction values and IR correction signals interchangeably.

Figure 12A:
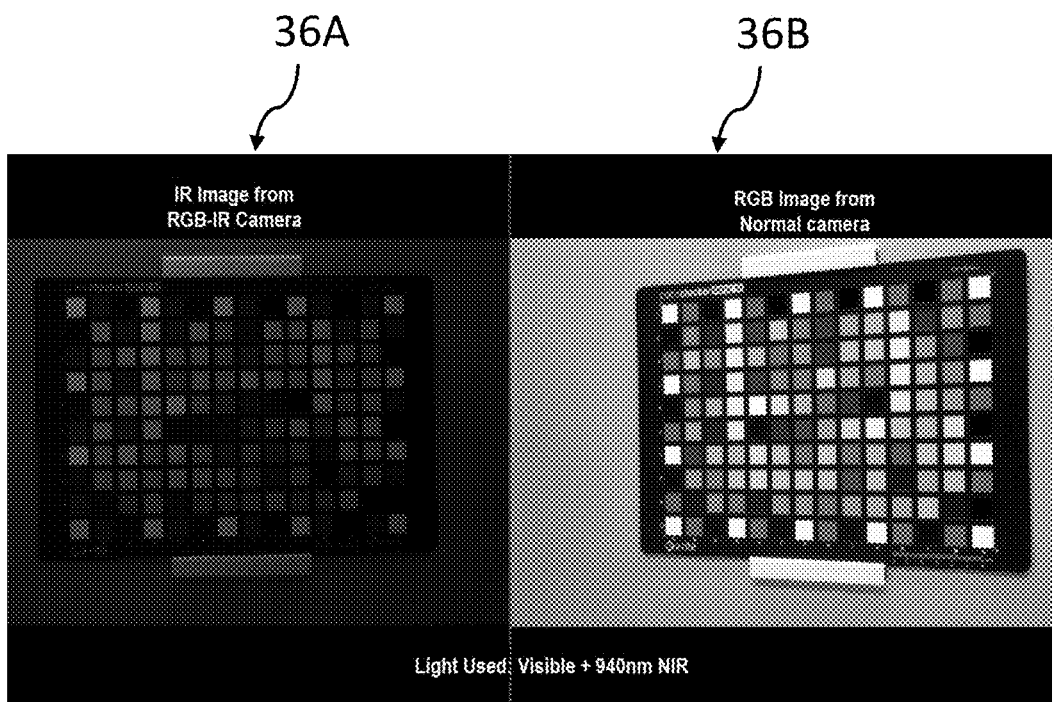
FIGS. 12A-12D are corrected RGB images from RGB-IR camera and RGB images from RGB camera for subjective comparison.
Figure 12B:
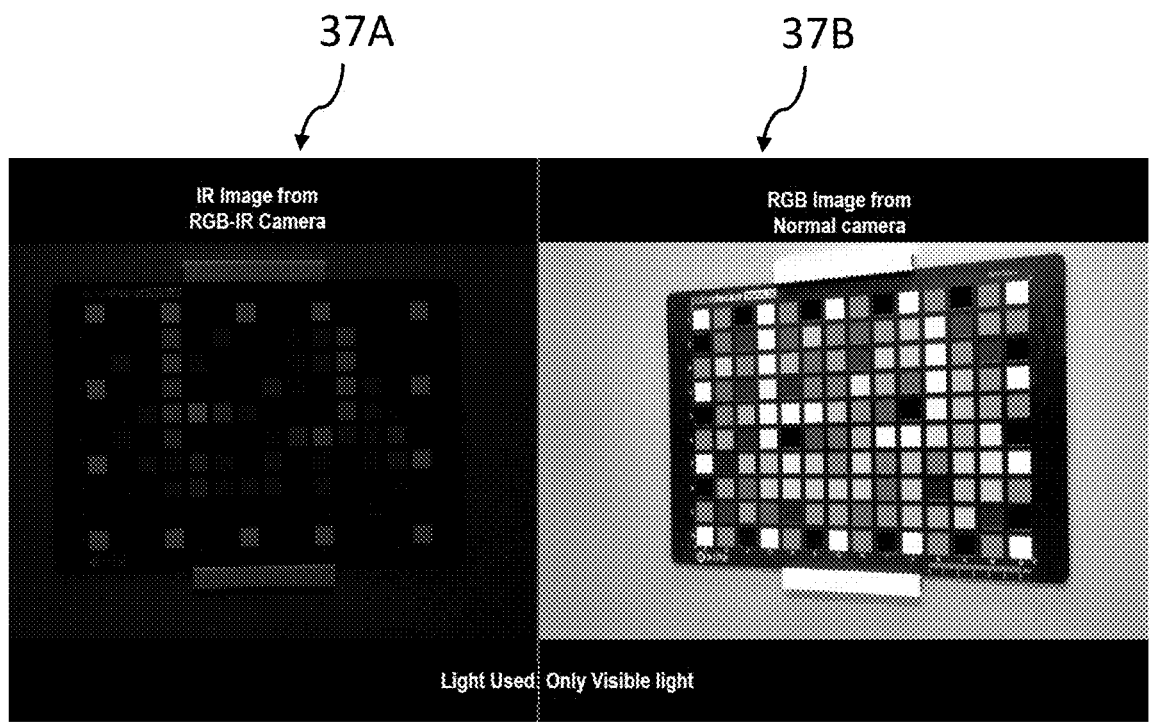
Figure 12C:
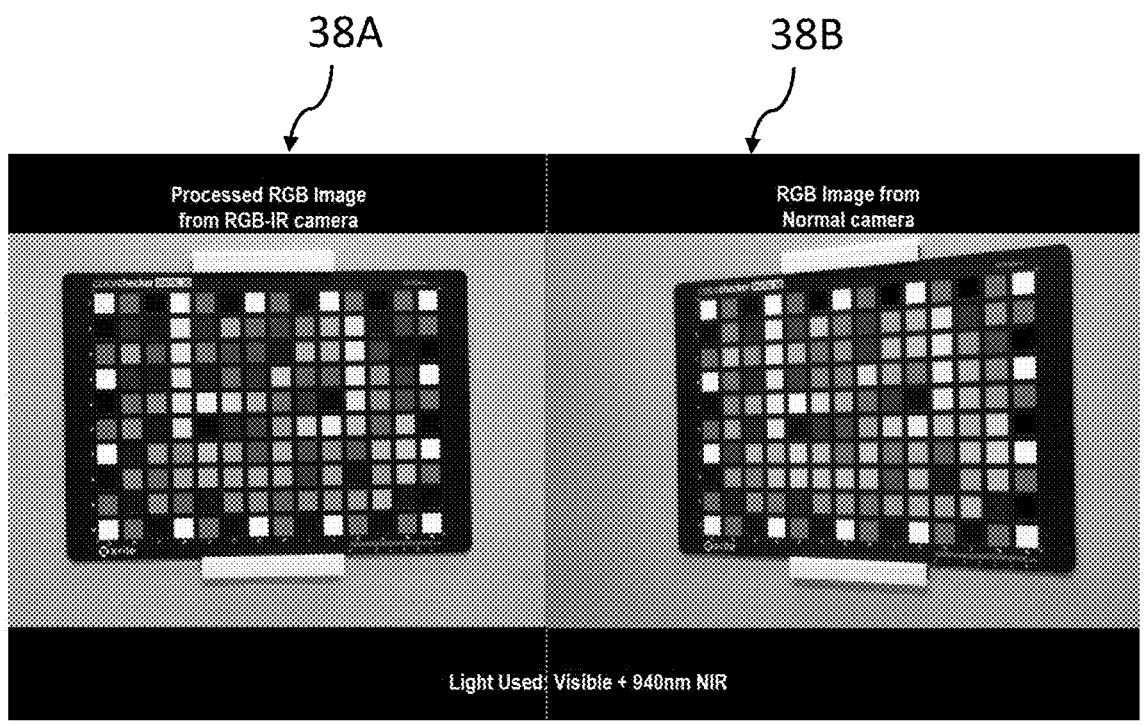
Figure 12D:
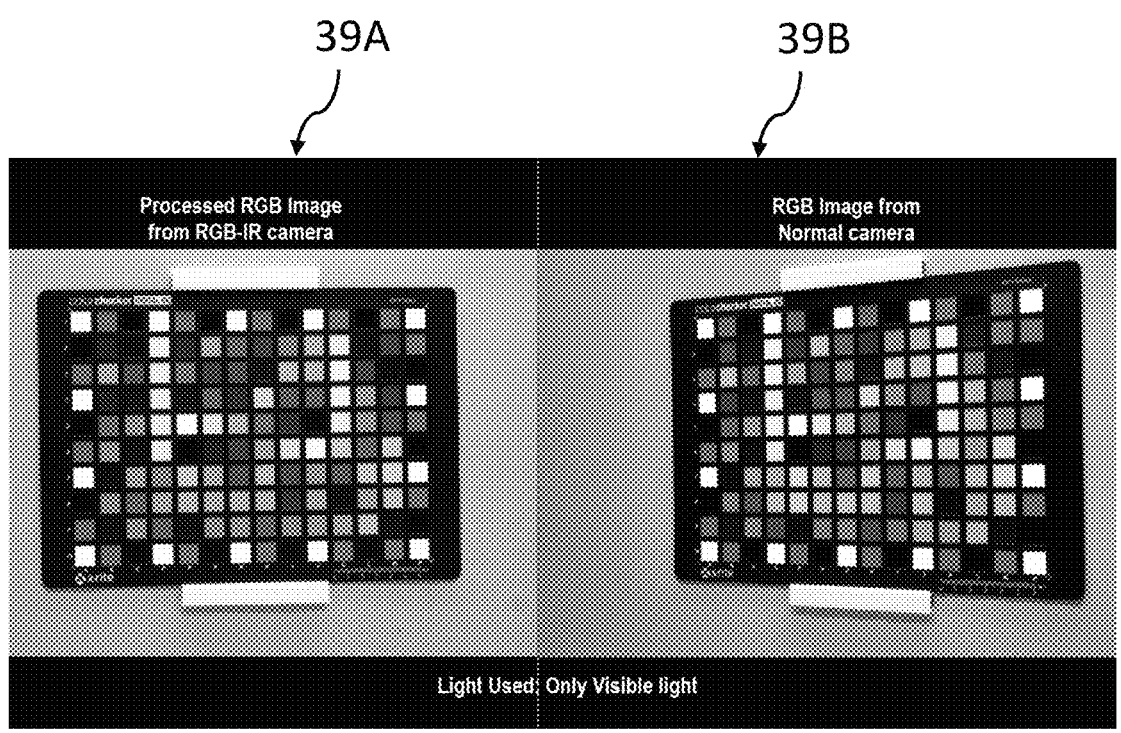

To appreciate the significance of the present invention, following Figures are pertinent as described below:

FIG. 12A is captured in visible plus NIR light, analogous to daylight wherein the left image (36A) is an IR image from an RGB-IR camera and the right image (36B) is a RGB image from a RGB camera (44), FIG. 12B is captured in only visible light, analogous to night lighting wherein the left image (37A) is an IR image from a RGB-IR camera and the right image (37B) is a RGB image from a RGB camera (44), FIG. 12C is captured in visible plus NIR light, analogous to daylight wherein the left image (38A) is a processed RGB image as per present invention and the right image (38B) is a RGB image from a RGB camera (44), and FIG. 12D is captured in only visible light, analogous to night lighting wherein the left image (39A) is a processed RGB image as per present invention and the right image (39B) is a RGB image from a RGB camera (44).

A qualitative assessment of FIGS. 12A-12B tends to indicate that a corrected RGB image from an RGB-IR camera is truer in colors than an RGB image from an RGB camera alone. Further, an IR image is generatable from the present invention, which has significant application in night vision and medical field.

Figure 13:
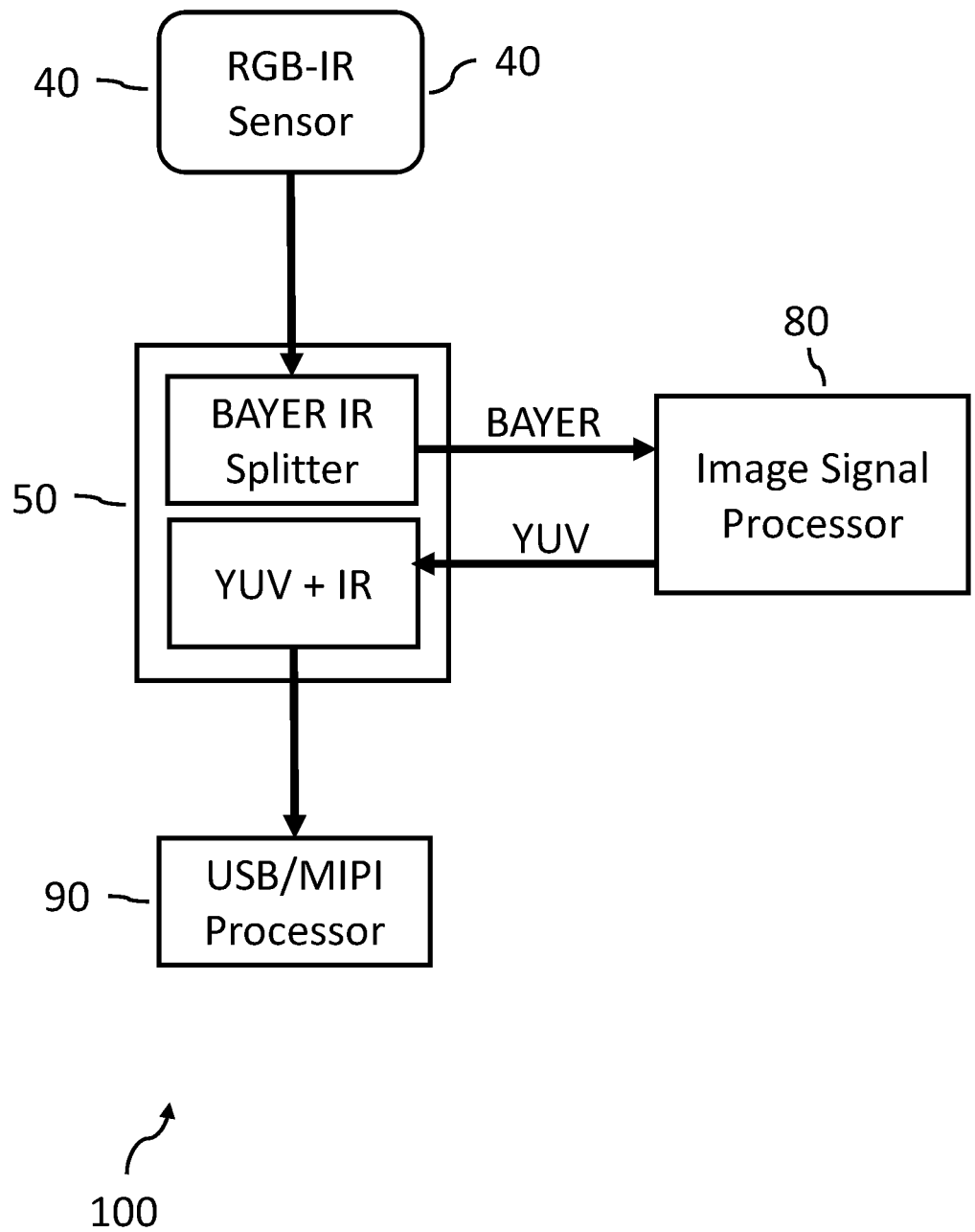
FIG. 13 is a block diagram of a system as per present invention.

FIG. 13, such color and IR images in the 2×2 pixel Bayer RGGB pattern are further processed in a known Image Signal Processor (ISP) (80), illustratively Arm Mali-C55 for generic picture qualities including luminous parameters namely brightness, contrast, etc. and then RGB capture is sent as YUV to a known MIPI/USB processor (90) communicating on a Mobile Industry Processor Interface (MIPI) or a USB protocol for display or further application.

YUV color-spaces are considered a more efficient coding and reduce the bandwidth more than RGB capture can. Most video cards, therefore, render directly using YUV or luminance/chrominance images.

The method described above is deployed as a system (100) as per present invention, to produce an enhanced color image of Bayer 2×2 pixel pattern and an enhanced IR image, from a color image of 4×4 pixel color pattern, the system comprising:
a. An RGB IR camera (40) with a dual pass filter permitting visible light and infra-red light
b. An integrated circuit device (50) configured to
  i. Predict missing R, G, B and IR pixel to convert 4×4 pixel patterns to 2×2 Bayer color patterns and IR patterns
  ii. Correct each R, G, B pixel of the 2×2 Bayer color patterns by a calibrated IR subtraction function
c. An image signal processor (80) configured to
  i. receive the 2×2 Bayer color patterns to produce the enhanced color image
  ii. receive the IR patterns to produce the enhanced IR image
d. A Host Processor (90) to process and display the enhanced color images of Bayer 2×2 RGGB pattern and IR images.

The system (100) further comprising a set of executable instructions residing in the integrated circuit device (50), the executable instructions execute the steps of:
Receiving an image from a RGB-IR camera sensor in a 4×4 pixel pattern
Breaking the 4×4 RGB-IR pattern to 2×2 RGB Bayer pattern and IR pixels pattern
Subtracting IR from each of R, G and B pixels, as per a set of look up tables based on a set of linear equations, described above.

Figure 14:
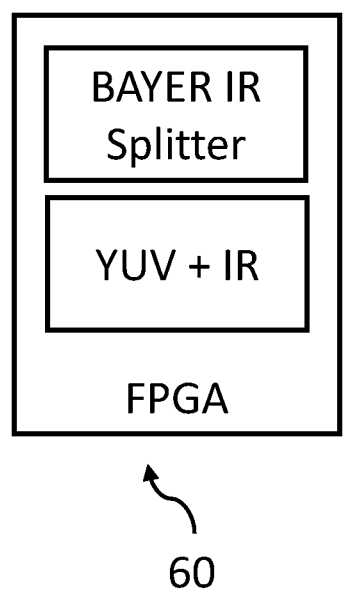

FIG. 14, the present invention, as a preferred embodiment deploys a Field Programmable Gate Array (FPGA) (60) as the integrated circuit device (50). A computer program residing in the FPGA (60) executes the steps of:
Developing subtraction function from calibration images
Predicting R, G, B pixels in 4×4 pixel pattern,
Predicting IR pixels
Generating new R, G, B values by applying subtraction function
Generating 2×2 pixel Bayer RGGB images
Generating IR images Essentially, the FPGA (60) handles the 4×4 RGB-IR pixel pattern, which the known image signal processors are incapable of, and "splits" the 4×4 pixel pattern to 2×2 color and IR pixel patterns, which are then further processed by the known signal processors as per prior art. Image data received from the Image signal processor (80) may be in various formats, such as YUV for RGB signals.

Figure 15:
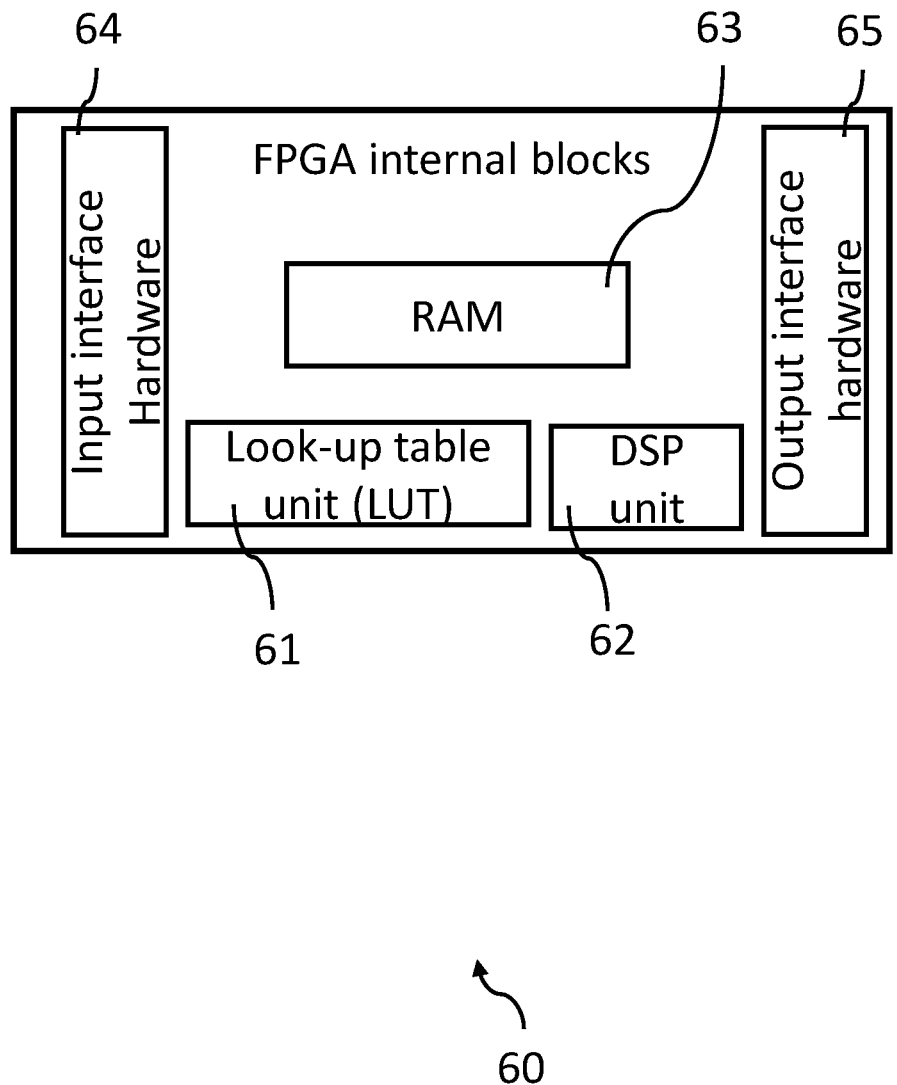
FIG. 15 is a block diagram of constituents thereof.

FIG. 15, the field-programmable gate array (FPGA) (60), being one of an integrated circuit particularly designed to be configured in field, since FPGAs contain an array of programmable logic blocks, thus the term field-programmable, are most appropriate hardware for the present invention. The IR subtraction functions generated as per the present invention described above reside as a look up table in a look up table unit (LUT) (61). A Digital Signal Processors (DSP) unit (62) is capable of receiving real-world signals like voice, audio, video, optical, temperature, pressure, or position that have been digitized and then mathematically manipulate them. A DSP, as is known, is designed for performing mathematical functions like "add", "subtract", "multiply" and "divide" very quickly. The FPGA (60) is integrated with its own random access memory (RAM) (63), an input interface hardware (64) and an output interface hardware (65). Such apt integrated circuit device (50) as the FPGA (60) as described is optimally deployed in the present invention for an economical and robust solution.

Figure 16:
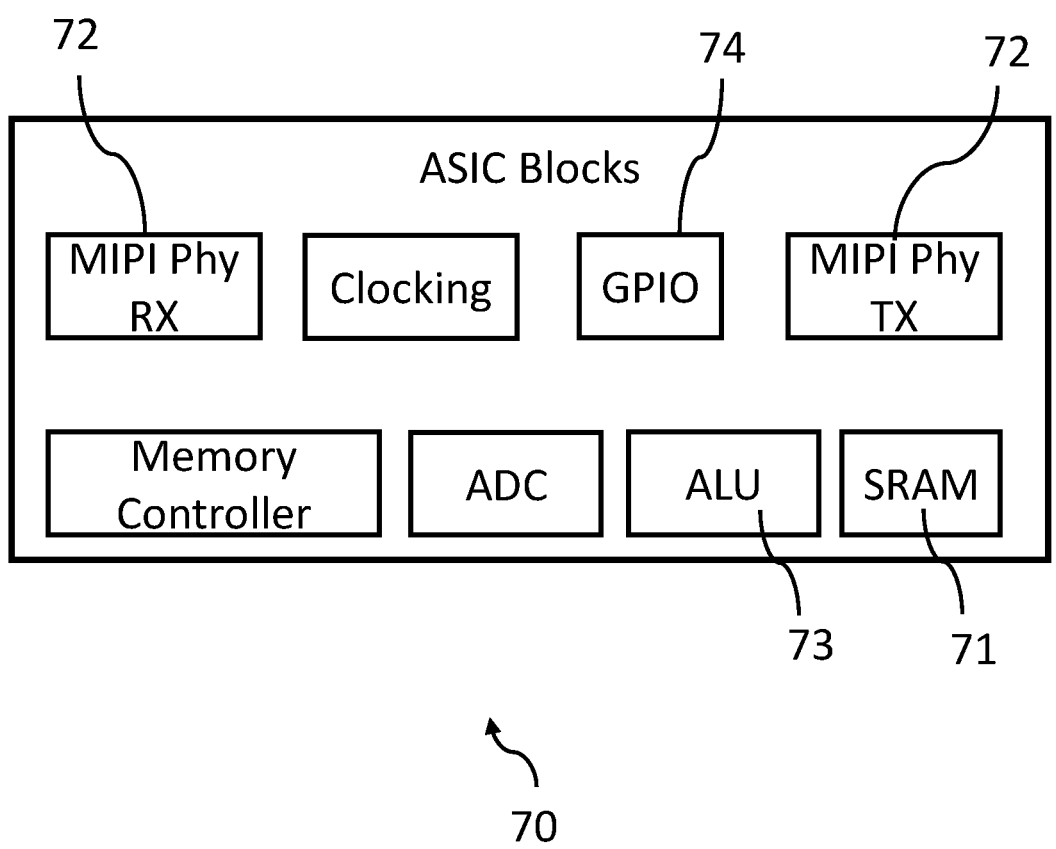
FIG. 16 is a constituent block diagram of an application specific integrated circuit (ASIC) deployable for the present invention.

FIG. 16, however, the present invention is not limited thereto, and a contemporary application specific integrated circuit (ASIC) (70) or an electronic circuits including static random access memory (SRAM) (71) and mobile industry processor interface (MIPI©) (72) with contemporary arithmetic logic unit (ALU) (73) and general purpose inputs Outputs (GPIO) (74) are deployable instead.

We claim:

1. A method to produce an enhanced color image of Bayer 2×2 pixel pattern from a 4×4 pixel initial color pattern containing separate R, G, B, and infra-red (IR) light pixels, the method comprising the steps of:
   a. Predicting replacement R pixels from initial nearby R pixels;
   b. Replacing B pixels from each horizontal row of predominantly G and R pixels by a correspondingly predicted replacement R pixels
   c. Predicting replacement B pixels from initial nearby B pixels;
   d. Replacing initial IR pixels from each horizontal row of predominantly IR and G pixels by a correspondingly predicted replacement B pixels;
   e. Determining calibrated IR contents;
   f. Providing enhanced color R, G, B, and replacement B pixels by subtracting the calibrated IR contents from each of the R, G and B pixels, and
   g. Constituting the enhanced color image of Bayer 2×2 pixel RGGB pattern from said enhanced color R, G, and B pixels.

2. The method to produce an enhanced color image of Bayer 2×2 pixel pattern from a 4×4 pixel initial color pattern containing separate R, G, B, and infra-red (IR) light pixels as claimed in claim 1, wherein predicting the replacement R pixel comprises calculating arithmetic mean of closest R pixels situated on either side of the B pixel to be replaced in the 4×4 pixel color pattern.

3. The method to produce an enhanced color image of Bayer 2×2 pixel pattern from a 4×4 pixel initial color pattern containing separate R, G, B, and infra-red (IR) light pixels as claimed in claim 1, wherein predicting a replacement B pixel comprises calculating arithmetic mean of B pixels situated diagonally on either side of the IR pixel to be replaced in the 4×4 pixel color pattern.

4. The method to produce an enhanced color image of Bayer 2×2 pixel pattern from a 4×4 pixel initial color pattern containing separate R, G, B, and infra-red (IR) light pixels as claimed in claim 1, wherein the calibrated IR contents are a set of IR subtraction values calculated according to a set of linear equations, generated from a plurality of images of a reference object captured as illuminated by a plurality of visible light mixed with infra-red light of varying intensity.

5. The method to produce an enhanced color image of Bayer 2×2 pixel pattern from a 4×4 pixel initial color pattern containing separate R, G, B, and infra-red (IR) light pixels as claimed in claim 4, wherein the capturing the images of the reference object includes capturing through a dual filter permitting IR and visible light, and color filtering permitting capturing only visible light of the plurality of images.

6. A method to produce an enhanced IR image from a 4×4 pixel initial color pattern containing R, G, B and infra-red light pixels, the method comprising the steps of:

a. Predicting replacement IR pixels from nearby IR pixels;
b. Replacing R, G, and B pixels by a correspondingly predicted IR pixels; and
c. Constituting an IR image.

7. The method to produce an enhanced IR image from a 4×4 pixel initial color pattern containing R, G, B and infra-red light pixels as claimed in claim 6, wherein predicting the replacement IR pixel comprises calculating arithmetic mean of IR pixels situated on adjacent horizontal rows of the replacement pixel position.

8. The method to produce an enhanced IR image from a 4×4 pixel initial color pattern containing R, G, B and infra-red light pixels as claimed in claim 6, wherein predicting the replacement IR pixel comprises calculating arithmetic mean of IR pixels situated on adjacent vertical columns of the replacement pixel position.

9. The method to produce an enhanced IR image from a 4×4 pixel initial color pattern containing R, G, B and infra-red light pixels as claimed in claim 6, wherein predicting the replacement IR pixel comprise calculating arithmetic mean of the four IR pixels situate at the four corners of the replacement pixel position.

10. A system to produce an enhanced color image of Bayer 2×2 pixel pattern and an enhanced IR image, from a color image of 4×4 pixel color pattern, the system comprising:
   a. An RGB IR camera with a dual pass filter permitting visible light and infra-red light as separate R, G, B and IR pixels;
   b. An integrated circuit device configured to
      i. Predict corresponding replacement R, G, B, and IR from nearby R, G, B, and IR pixels,
      ii. convert 4×4 pixel patterns to 2×2 Bayer color patterns and IR patterns to include corresponding replacement R, G, B, and IR pixels,
      iii. Determining an IR correction signals, and
      iv. Correct each R, G, B pixel of the 2×2 Bayer color patterns by subtraction of said IR correction signals;
   c. An image signal processor configured to
      i. receive the 2×2 Bayer color patterns to produce the enhanced color image with prescribed luminous parameters, and
      ii. receive the IR patterns to produce the enhanced IR image with prescribed luminous parameters; and
   d. A Host Processor to display the enhanced color image and the enhanced IR image.

11. The system to produce an enhanced color image of Bayer 2×2 pixel pattern and an enhanced IR image, from a color image of 4×4 pixel color pattern, as claimed in claim 10, wherein the system further comprising a set of executable instructions residing in the integrated circuit device, the executable instructions comprise:
   a. Receiving an image from a RGB-IR camera sensor in a 4×4 pixel pattern,
   b. Breaking the 4×4 RGB-IR pattern to 2×2 RGB Bayer pattern and IR pixels pattern, and
   c. Subtracting an IR correction signal from each of R, G and B pixels.

12. The system to produce an enhanced color image of Bayer 2×2 pixel pattern and an enhanced IR image, from a color image of 4×4 pixel color pattern, as claimed in claim 10, wherein the integrated circuit device is a field programmable gate array.

13. The system to produce an enhanced color image of Bayer 2×2 pixel pattern and an enhanced IR image, from a color image of 4×4 pixel color pattern, as claimed in claim 10, wherein the integrated circuit device is one of an application specific integrated circuit, and a combination of electronic circuits including static random access memory (SRAM) and mobile industry processor interface (MIPI®).

* * * * *